United States Patent
Isobe et al.

(10) Patent No.: US 11,154,994 B2
(45) Date of Patent: Oct. 26, 2021

(54) WORK DEVICE AND DUAL-ARM WORK DEVICE

(71) Applicant: NTN CORPORATION, Osaka (JP)

(72) Inventors: Hiroshi Isobe, Iwata (JP); Kenzou Nose, Iwata (JP); Naoki Marui, Iwata (JP); Hiroyuki Yamada, Iwata (JP)

(73) Assignee: NTN CORPORATION, Osaka (JP)

( * ) Notice: Subject to any disclaimer, the term of this patent is extended or adjusted under 35 U.S.C. 154(b) by 396 days.

(21) Appl. No.: 16/164,486

(22) Filed: Oct. 18, 2018

(65) Prior Publication Data
US 2019/0047159 A1    Feb. 14, 2019

Related U.S. Application Data

(63) Continuation of application No. PCT/JP2017/014683, filed on Apr. 10, 2017.

(30) Foreign Application Priority Data

Apr. 20, 2016  (JP) .............................. JP2016-084171

(51) Int. Cl.
*B25J 17/02*   (2006.01)
*F16H 21/46*   (2006.01)
(Continued)

(52) U.S. Cl.
CPC ......... *B25J 17/0283* (2013.01); *B25J 9/0018* (2013.01); *B25J 9/0048* (2013.01);
(Continued)

(58) Field of Classification Search
CPC .. B25J 9/0048; B25J 17/0283; B25J 19/0041; B25J 9/026; B25J 9/0018; B25J 9/0087; F16H 21/46
See application file for complete search history.

(56) References Cited

U.S. PATENT DOCUMENTS 4,723,460 A * 2/1988 Rosheim .............. B25J 17/0275
  403/58
4,832,563 A * 5/1989 Massmann ........... B25J 17/0283
  414/744.5
(Continued)

FOREIGN PATENT DOCUMENTS

CN     101559597     10/2009
CN     101947781     1/2011
(Continued)

OTHER PUBLICATIONS

International Preliminary Report on Patentability dated Nov. 1, 2018 in corresponding International Patent Application No. PCT/JP2017/014683, 11 pgs.
(Continued)

*Primary Examiner* — William Kelleher
*Assistant Examiner* — Gregory T Prather

(57) ABSTRACT

A work device is configured to perform a work with use of an end effector and have six degrees of freedom. The work device including: a linear motion unit obtained by combining three linear motion actuators, to have three degrees of freedom; and a rotation unit obtained by combining a plurality of rotation mechanisms each having one or more degrees of rotational freedom, to have three degrees of freedom. A base portion of the linear motion unit is fixed to a mount. A base portion of the rotation unit is fixed to an output portion of the linear motion unit. The end effector is mounted to an output portion of the rotation unit.

13 Claims, 17 Drawing Sheets

(51) Int. Cl.
    *B25J 9/08*                (2006.01)
    *B25J 9/02*                (2006.01)
    *B25J 9/00*                (2006.01)
    *B25J 9/04*                (2006.01)

(52) U.S. Cl.
    CPC ............. *B25J 9/0087* (2013.01); *B25J 9/023* (2013.01); *B25J 9/026* (2013.01); *B25J 9/04* (2013.01); *B25J 9/08* (2013.01); *F16H 21/46* (2013.01)

(56) References Cited

U.S. PATENT DOCUMENTS

| | | | |
|---|---|---|---|
| 9,248,572 B2 | 2/2016 | Ide et al. | |
| 10,406,677 B2 | 9/2019 | Isobe et al. | |
| 10,890,236 B2* | 1/2021 | Sakata | B25J 9/1623 |
| 2005/0159075 A1* | 7/2005 | Isobe | B25J 9/0048 446/104 |
| 2005/0199085 A1* | 9/2005 | Isobe | B25J 9/0048 74/490.05 |
| 2006/0213048 A1* | 9/2006 | Kalanovic | B25J 17/0283 29/468 |
| 2008/0028881 A1* | 2/2008 | Sone | B25J 17/0266 74/471 R |
| 2012/0043100 A1* | 2/2012 | Isobe | B25J 17/0266 173/42 |
| 2012/0053701 A1* | 3/2012 | Yi | B25J 9/1689 700/3 |
| 2013/0055843 A1* | 3/2013 | Isobe | F16C 1/02 74/490.04 |
| 2014/0223722 A1* | 8/2014 | Isobe | B25J 9/1623 29/428 |
| 2014/0248965 A1* | 9/2014 | Isobe | F16C 19/46 464/112 |
| 2015/0088308 A1* | 3/2015 | Isobe | B25J 9/0048 700/245 |
| 2015/0120059 A1* | 4/2015 | Ide | G05B 19/402 700/264 |
| 2016/0008977 A1* | 1/2016 | Nishio | B25J 9/1664 700/262 |
| 2016/0059426 A1* | 3/2016 | Sone | B25J 9/0048 74/490.05 |
| 2017/0014994 A1* | 1/2017 | Isobe | B25J 9/0009 |
| 2017/0205022 A1* | 7/2017 | Trui | B23Q 1/50 |
| 2017/0268640 A1* | 9/2017 | Sakata | B25J 9/106 |
| 2018/0194002 A1* | 7/2018 | Isobe | B25J 5/02 |
| 2018/0207810 A1* | 7/2018 | Konagai | B25J 17/00 |
| 2018/0236619 A1* | 8/2018 | Nose | B23Q 1/44 |
| 2018/0290294 A1* | 10/2018 | Nose | B25J 9/0048 |
| 2019/0047159 A1* | 2/2019 | Isobe | F16H 21/46 |
| 2019/0099878 A1* | 4/2019 | Marui | B25J 9/1623 |
| 2019/0105769 A1* | 4/2019 | Nose | B25J 9/106 |
| 2019/0111561 A1* | 4/2019 | Isobe | B25J 9/1676 |
| 2019/0152046 A1* | 5/2019 | Konagai | B25J 9/0048 |
| 2019/0255699 A1* | 8/2019 | Isobe | B25J 9/0087 |
| 2019/0255700 A1* | 8/2019 | Nose | B25J 9/16 |
| 2019/0366535 A1* | 12/2019 | Sakata | B25J 5/02 |
| 2020/0206897 A1* | 7/2020 | Isobe | B25J 9/003 |
| 2020/0298425 A1* | 9/2020 | Au | B25J 9/0048 |
| 2020/0376687 A1* | 12/2020 | Noh | H02K 9/22 |

FOREIGN PATENT DOCUMENTS

| | | |
|---|---|---|
| CN | 102785239 | 11/2012 |
| CN | 204414100 | 6/2015 |
| DE | 10 2013 225 116 | 7/2015 |
| JP | 7-178684 | 7/1995 |
| JP | 8-10935 | 1/1996 |
| JP | 2002-336994 | 11/2002 |
| JP | 2005-329521 | 12/2005 |
| JP | 2009-202331 | 9/2009 |
| JP | 4528312 | 6/2010 |
| JP | 2014-119069 | 6/2014 |
| JP | 2015-85427 | 5/2015 |
| WO | WO 2010/002043 A1 | 1/2010 |
| WO | 2015/151898 | 10/2015 |

OTHER PUBLICATIONS

International Search Report dated Jul. 11, 2017 in corresponding International Patent Application No. PCT/JP2017/014683.
Extended European Search Report dated Mar. 26, 2019 in corresponding European Patent Application 17785845.3 (7 pages).
Notice of Reasons for Refusal dated Jan. 14, 2020 in Japanese Patent Application No. 2016-084171 (5 pages) (5 pages English Machine Translation).
Chinese Office Action dated Feb. 26, 2021, in Chinese Patent Application No. 201780024365.X, 16 pages including translation.
Chinese Office Action dated Aug. 13, 2021, in Chinese Application No. 201780024365.X (15 pages including translation).
Zhu, Dachang et al. "Theory of Perfectly Flexible Parallel Mechanism—Research About Space Ultra Precise Measurement System in Micro Nano Size Level" Metallurgical Industry Press, Sep. 2013, vol. 1, p. 16 (4 pages including machine and partial English translation).

* cited by examiner

WORK DEVICE AND DUAL-ARM WORK DEVICE

CROSS REFERENCE TO THE RELATED APPLICATION

This application is a continuation application, under 35 U.S.C. § 111(a) of international patent application No. PCT/JP2017/014683, filed Apr. 10, 2017, which claims priority to Japanese patent application No. 2016-084171, filed Apr. 20, 2016, the entire disclosure of which is herein incorporated by reference as a part of this application.

BACKGROUND OF THE INVENTION

Field of the Invention

The present invention relates to an operation device and a dual-arm operation device that are used for, for example: equipment such as medical equipment or industrial equipment requiring works to be performed at high speed with high accuracy; equipment requiring delicate works such as assembling; and a robot that coexists with humans.

Description of Related Art

Patent Documents 1 and 2 have suggested work devices of multi-articulated robot types having six degrees of freedom. The work device in Patent Document 1 has a single-arm configuration, and the work device in Patent Document 2 has a dual-arm configuration. Each of these work devices is obtained by combining six mechanisms each having one degree of rotational freedom, to have six degrees of freedom as a whole.

RELATED DOCUMENT

Patent Document

[Patent Document 1] JP Laid-open Patent Publication No. 2005-329521

[Patent Document 2] JP Patent No. 4528312

The work device in Patent Document 1 is formed by combining mechanisms all of which have one degree of rotational freedom, and thus has the following problems 1 to 6.

(Problem 1) In a case where the posture of an end effector mounted to a distal end is slightly changed or linear movement is performed, a plurality of motors need to be driven so as to be coordinated with each other, and thus delicate works cannot be performed at high speed.

(Problem 2) Even in the case where the posture of the end effector is slightly changed, the movement amounts of not only a wrist joint (a joint close to the end effector) but also an arm (a portion located apart from the end effector) become large, and thus, a part of the work device is likely to come into contact with a nearby object. In order to completely prevent such a contact, a large barrier needs to be provided, resulting in a larger occupation area.

(Problem 3) There are sometimes a plurality of solutions for one posture of the end effector, and thus, it is hard to imagine in what direction the distal end is to move upon, when each axis is manipulated during performing teaching. Therefore, knowledge and experience are required for performing manipulation.

(Problem 4) Since the range of possible movement is wide, care must be taken to avoid the contact with humans or objects, and thus the entire device is costly.

(Problem 5) In order to prevent the contact with humans or objects, a work is required to be performed at a reduced motion speed, or a work is required to be performed with a motion range such that the capability is not surpassed, and thus, the capability cannot be sufficiently exhibited.

(Problem 6) Even if a safeguard is enhanced, workers are anxious about coming into contact with work devices, and thus it is difficult for humans and work devices to coexist.

Also the work device in Patent Document 2 has the same problems as those of the work device in Patent Document 1. In addition, the work device in Patent Document 2 which is of a dual-arm type has the following problems 7 and 8.

(Problem 7) The range of possible movement of each arm is wide, and thus, the region where the arms interfere with each other is also wide. In order to perform motion such that the arms do not come into contact with each other, knowledge and experience are required.

(Problem 8) Since the number of the arms having wide ranges of possible movement is two, provision of a barrier results in a further wider occupation area.

SUMMARY OF THE INVENTION

An object of the present invention is to provide a work device which allows the motion amount of the entirety thereof to be small at the time of a delicate work, can coexist with humans, and can automatically perform a work similar to a manual work that is performed by a human.

A work device according to the present invention performs a work with use of an end effector and has six degrees of freedom, the work device including: a linear motion unit obtained by combining three linear motion actuators, to have three degrees of freedom; and a rotation unit obtained by combining a plurality of rotation mechanisms each having one or more degrees of rotational freedom, to have three degrees of freedom. The linear motion unit is provided such that a base portion thereof is fixed to a mount of the work device. A base portion of the rotation unit is fixed to an output portion of the linear motion unit, and the end effector is mounted to an output portion of the rotation unit.

In this configuration, the position of the end effector is determined mainly by the linear motion unit having three degrees of freedom, and the posture of the end effector is determined by the rotation unit having three degrees of freedom. The linear motion actuators of the linear motion unit and the rotation mechanisms of the rotation unit correspond to a position and a posture of the end effector expressed with a rectangular coordinate system. Accordingly, it is easy to imagine motions of the linear motion actuators and the rotation mechanisms corresponding to the position and the posture of the end effector, and thus, motion pattern setting such as a posture teaching work is easily performed. In addition, the motion positions of the linear motion actuators and the motion angles of the rotation mechanisms are uniquely determined correspondingly to the position and the posture of the end effector. That is, no singularity is generated. Owing to these features, the work device can be manipulated even without knowledge or experience abundantly gained over time.

Besides the above, the following operations and effects (effects 1 to 5) can be obtained.

(Effect 1) In a case where a delicate work such as an assembling work is performed, the work can be performed mainly by moving only the rotation unit. Therefore, the motion amount of the linear motion unit can be made small, and the range of possible movement of the entire device can be made small. In addition, the area of a region in which a barrier needs to be provided can be made small.

(Effect 2) Since each linear motion actuator is used at a portion that greatly influences the range of possible movement, the motion range can be easily restricted with use of a mechanical stopper or a limit sensor in accordance with the type of the work and the ambient environment.

(Effect 3) Since the linear motion unit and the rotation unit are separately provided, only one of the units may be changed in a case where the specifications of the work device are changed. Accordingly, the same components can be used among work devices that are different in specifications from one another.

(Effect 4) Since the position of the end effector is determined by the linear motion actuators, linear motion of the end effector can be accurately performed at high speed.

(Effect 5) A barrier such as a cover having a simple shape such as that of a rectangular parallelepiped can be provided. In this case, the volume of an internal space of the barrier, and the volume of a region within which the movable portion of the device moves, are approximately equal to each other. Therefore, a compact configuration can be realized even if the barrier is provided.

In the present invention, each of the linear motion actuators may include a stage which is an advancing/retreating portion, and the linear motion actuators of the linear motion unit may be disposed such that the respective stages face outward relative to a work space in which a work is performed by the end effector. By the stages of the linear motion actuators being disposed so as to face outward relative to the work space, the work space can be made wider.

In the present invention, at least one of the plurality of rotation mechanisms in the rotation unit may be a link actuation device having two degrees of freedom. In the link actuation device, a distal-end-side link hub may be connected to a proximal-end-side link hub so as to be changeable in posture relative to the proximal-end-side link hub via three or more link mechanisms, each link mechanism may include: a proximal-side end link member and a distal-side end link member which have one ends rotatably connected to the proximal-end-side link hub and the distal-end-side link hub, respectively; and a center link member which has opposed ends rotatably connected to the other ends of the proximal-side end link member and the distal-side end link member, respectively, and two or more link mechanisms among the three or more link mechanisms may each include a posture-controlling actuator configured to arbitrarily change a posture of the distal-end-side link hub relative to the proximal-end-side link hub.

The link actuation device includes the proximal-end-side link hub, the distal-end-side link hub and the three or more link mechanisms, to attain a mechanism having two degrees of freedom in which the distal-end-side link hub is rotatable relative to the proximal-end-side link hub about two axes orthogonal to each other. This mechanism having two degrees of freedom is compact but provides a wide range of possible movement of the distal-end-side link hub. For example, the maximum value of the bend angle formed by the central axis of the proximal-end-side link hub and the central axis of the distal-end-side link hub can be set to about ±90°, and the angle of traverse of the distal-end-side link hub relative to the proximal-end-side link hub can be set to a range of 0° to 360°. Smooth motion with no singularity can be realized in an operating range at a bend angle of 90° and at an angle of traverse of 360°.

As described above, by using the link actuation device having a wide range of possible movement and being capable of smooth motion, a delicate work can be performed at high speed. In addition, the link actuation device has a compact configuration but has a wide range of possible movement, and thus, the entire work device has a compact configuration.

In a case where the rotation unit includes the link actuation device, the central axis of the proximal-end-side link hub or the central axis of the distal-end-side link hub, and a rotation axis of another rotation mechanism other than the link actuation device may be positioned on a same line.

Here, in a case where a point at which a central axis of a revolute pair between the proximal-end-side link hub and each proximal-side end link member intersects with a central axis of a revolute pair between the proximal-side end link member and the corresponding center link member is referred to as a proximal-end-side spherical link center, the central axis of the proximal-end-side link hub refers to a straight line that passes the proximal-end-side spherical link center and that intersects, at a right angle, with the central axis of the revolute pair between the proximal-end-side link hub and the proximal-side end link member. In a case where a point at which a central axis of a revolute pair between the distal-end-side link hub and each distal-side end link member intersects with a central axis of a revolute pair between the distal-side end link member and the corresponding center link member is referred to as a distal-end-side spherical link center, the central axis of the distal-end-side link hub refers to a straight line that passes the distal-end-side spherical link center and that intersects, at the right angle, with the central axis of the revolute pair between the distal-end-side link hub and the distal-side end link member.

If the central axis of each link hub and the rotation axis of the another rotation mechanism are positioned on the same line, calculation of coordinates can be easily performed. In addition, a worker can easily imagine the motion of the work device, and thus, can easily manipulate the work device. For example, in a state where positions in three degrees of freedom determined by the linear motion unit are fixed, and angles in two degrees of freedom among angles in three degrees of freedom determined by the rotation unit are fixed, a work can be performed while the posture of the end effector is being changed by changing only the angle in the remaining one degree of freedom (e.g., an angle about the central axis of the distal-end-side link hub).

In the above-described configuration, a rotating portion of the another rotation mechanism may be directly or indirectly joined to the proximal-end-side link hub of the link actuation device, and the end effector may be mounted to the distal-end-side link hub of the link actuation device.

If the another rotation mechanism is disposed on the proximal end side of the link actuation device and the end effector is disposed on the distal end side of the link actuation device as described above, the rotation angle is restricted since a cable for each posture-controlling actuator of the link actuation device needs to be taken into consideration. However, according to the above construction, load on the link actuation device can be reduced, whereby the link actuation device can be made compact and can be reduced in weight.

The link actuation device functions as a constant velocity universal joint that is rotated at a constant velocity with the same rotation angle being formed on the proximal end side and the distal end side when transmitting rotation from the proximal end side to the distal end side. Therefore, owing to coordinated control of the link actuation device and the another rotation mechanism, a work can be easily performed while the posture of the end effector is being changed in terms of only the angle about the central axis of the distal-end-side link hub.

In the above-described configuration, the two or more posture-controlling actuators of the link actuation device may be rotary actuators, rotational output shafts thereof may be arranged so as to be parallel to the central axis of the proximal-end-side link hub, in which case, rotational drive forces of the rotational output shafts may be transmitted to the link mechanisms via speed reducers of axis-orthogonal configuration, and the another rotation mechanism may be disposed at a center portion in the arrangement of the posture-controlling actuators. In this case, the rotation unit has a compact configuration.

In the above-described configuration, the another rotation mechanism may have a wiring hole therein which penetrates at least a rotating portion thereof in an axial direction. In this case, by inserting a wire through the wiring hole of the another rotation mechanism, the wire can be connected from the internal space side of the link actuation device to the end effector without interfering with any of the link mechanisms.

In the present invention, an attachment angle of the base portion of the rotation unit relative to the output portion of the linear motion unit may be changeable. In this case, the configuration of the device can be easily changed in accordance with the type of the work and the ambient environment.

A dual-arm work device according to the present invention is obtained by arraying two work devices each of which is recited in the present invention, such that the work devices are geometrically symmetric with each other. By arraying the two work devices in order to attain the dual-arm work device, a work that is performed by a human with both hands can be realized. Accordingly, a work to be performed in place of humans, particularly, a work such as assembling of components, can be performed.

The two work devices may be provided on the mount which is portal-shaped. With this configuration, a component to be worked on can be passed beneath the work devices. For example, the work devices can be provided above a conveyor line. In addition, the range of possible movement, in the widthwise direction, of each of the work devices can be restricted to be within a range, in the widthwise direction, of the mount. Thus the occupation areas of the work devices can be made small. Furthermore, since the ranges of possible movement of the work devices are restricted, a worker can easily perform a work even when the worker is located at a side of the work devices.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, embodiments of the present invention will be described with reference to the drawings.

Figure 1:
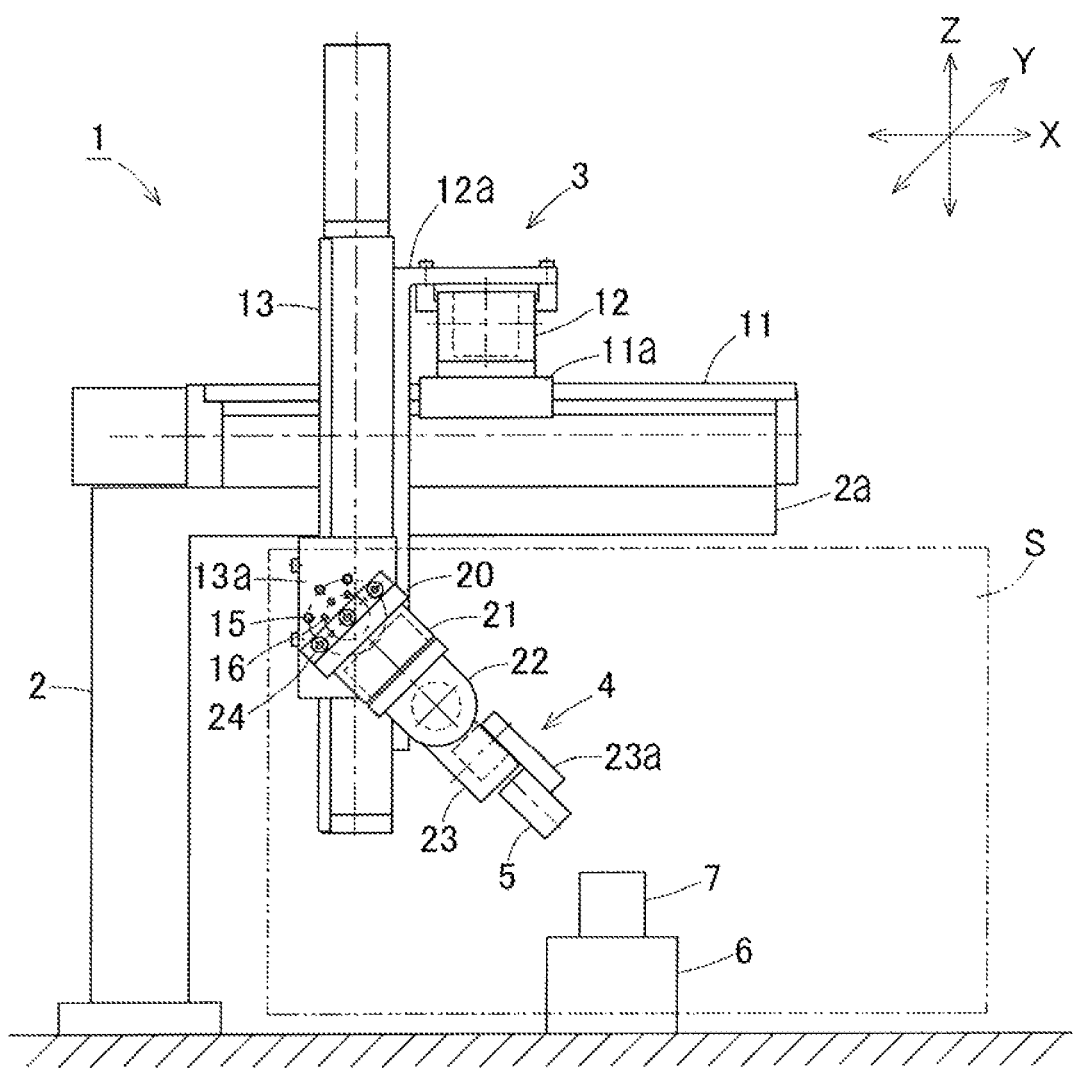
FIG. 1 is a front view showing a schematic configuration of a work device according to a first embodiment of the present invention.

FIG. 1 to FIG. 3B show a work device according to a first embodiment of the present invention. As shown in FIG. 1, the work device 1 includes: a mount 2; a linear motion unit 3 having a base portion fixed to the mount 2; a rotation unit 4 having a base portion fixed to an output portion of the linear motion unit 3; and an end effector 5 attached to an output portion of the rotation unit 4. The end effector 5 performs a work on a workpiece 7 placed on a workpiece placement table 6. The end effector 5 may perform a work on the workpiece 7 by coming into contact therewith, or may perform a work on the workpiece 7 without coming into contact therewith. The work to be performed on the workpiece 7 by the end effector 5 can be enabled within a range of a work space S below a horizontal portion 2a of the mount 2.

The linear motion unit 3 is configured to have three degrees of freedom by combining three linear motion actuators. The rotation unit 4 is configured to have three degrees of freedom by combining a plurality of rotation mechanisms each having one or more degrees of rotational freedom. Thus, the work device 1 is configured to have six degrees of freedom as a whole.

Figure 2A:
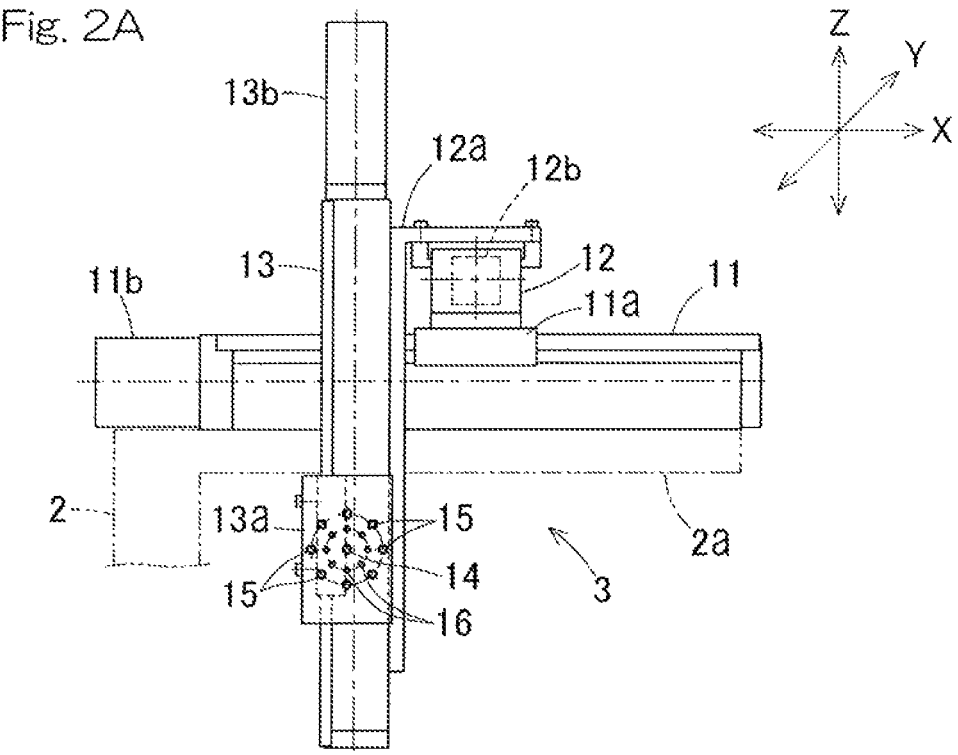
FIG. 2A is a front view of a linear motion unit of the work device.
Figure 2B:
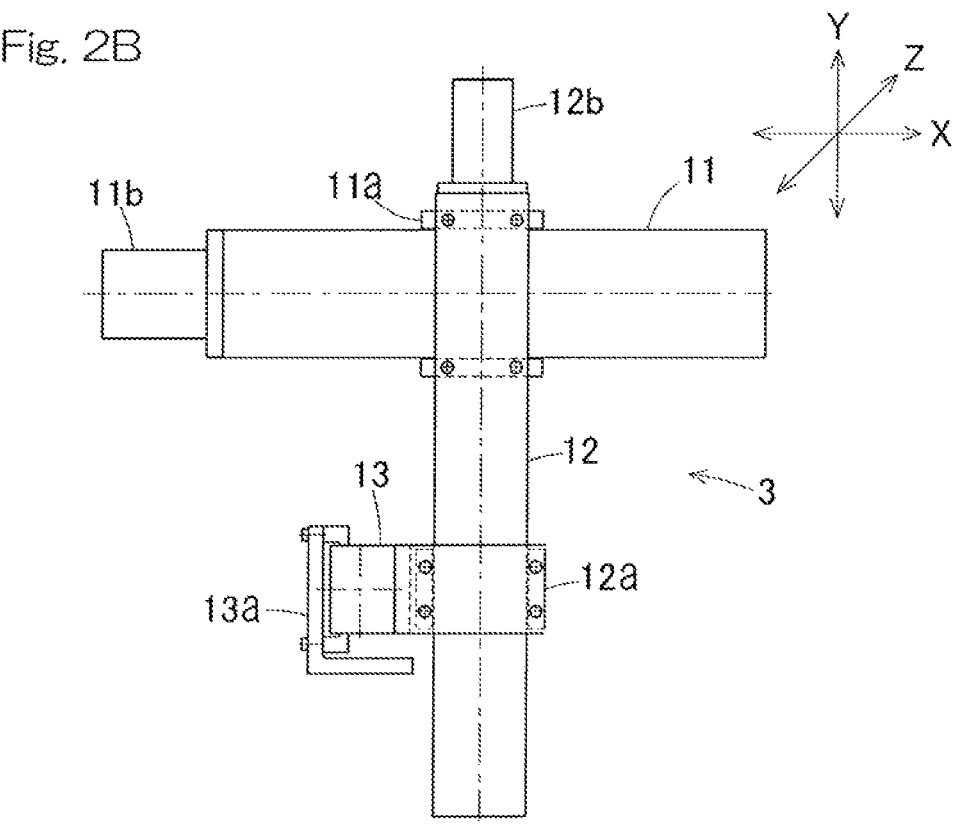
FIG. 2B is a plan view of the linear motion unit of the work device.

FIG. 2A and FIG. 2B are a front view and a plan view of the linear motion unit 3, respectively. The linear motion unit 3 includes a first linear motion actuator 11, a second linear motion actuator 12, and a third linear motion actuator 13. The first linear motion actuator 11 is provided on the horizontal portion 2a of the mount 2, and includes a stage 11a which advances/retreats in the left/right direction (X-axis direction). The second linear motion actuator 12 is provided on the stage 11a of the first linear motion actuator 11, and includes a stage 12a which advances/retreats in the front/rear direction (Y-axis direction). The third linear motion actuator 13 is provided on the stage 12a of the second linear motion actuator 12, and includes a stage 13a which advances/retreats in a vertical direction (Z-axis direction).

The first to third linear motion actuators 11, 12, and 13 are electric actuators that respectively use motors 11b, 12b, and 13b as drive sources. The first to third linear motion actuators 11, 12, and 13 are disposed such that the respective stages 11a, 12a, and 13a face outward relative to the work space S (FIG. 1). A fixed portion, of the first linear motion actuator 11, that does not perform any advancing/retreating motion serves as the base portion, of the linear motion unit 3, which is fixed to the mount 2. The stage 13a of the third linear motion actuator 13 serves as the output portion, of the linear motion unit 3, to which the base portion of the rotation unit 4 is fixed.

Figure 3A:
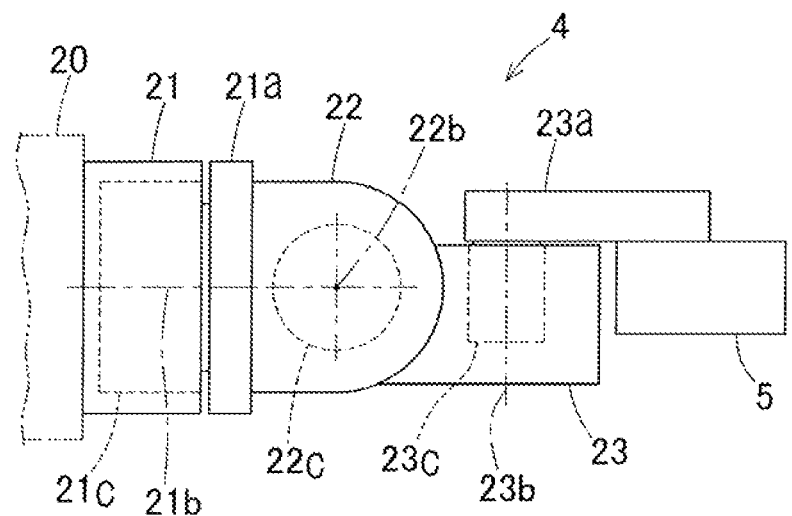
FIG. 3A is a front view of a rotation unit of the work device.
Figure 3B:
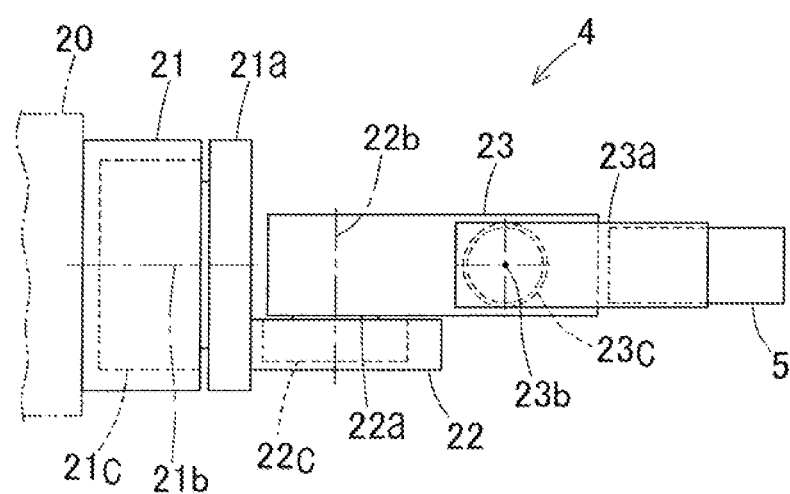
FIG. 3B is a plan view of the rotation unit of the work device.

FIG. 3A and FIG. 3B are a front view and a plan view of the rotation unit 4, respectively. The rotation unit 4 includes: a rotation-unit attachment member 20 fixed to the output portion of the linear motion unit 3 (FIG. 1); a first rotation mechanism 21 attached to the rotation-unit attachment member 20; a second rotation mechanism 22 attached to a rotating portion 21a of the first rotation mechanism 21; and a third rotation mechanism 23 attached to a rotating portion 22a of the second rotation mechanism 22. Rotation axes 21b, 22b, and 23b of the first to third rotation mechanisms 21, 22, and 23 are perpendicular to one another. Rotational drive sources of the respective rotation mechanisms 21, 22, and 23 are motors 21c, 22c, and 23c, for example.

The rotation-unit attachment member 20 serves as a base portion, of the rotation unit 4, that is fixed to the output portion of the linear motion unit 3. A rotating portion 23a of the third rotation mechanism 23 serves as the output portion, of the rotation unit 4, to which the end effector 5 is attached.

As shown in FIG. 2A, a first screw hole 14, a second screw hole 15 and a positioning hole 16 for fixing the rotation-unit attachment member 20 are provided in the stage 13a, of the third linear motion actuator 13, which is the output portion of the linear motion unit 3. A single first screw hole 14 is provided at a center portion of a location, on the stage 13a, at which the rotation-unit attachment member 20 is to be fixed. A plurality (in this embodiment, eight) of the second screw holes 15 are provided on a circle, on the stage 13a, that is centered on the first screw hole 14. The positioning holes 16, which are equal in number to the second screw holes 15, are provided on a circle, on the stage 13a, that is centered on the first screw hole 14 and that has a smaller radius than the circle on which the second screw holes 15 are provided.

The rotation-unit attachment member 20 is provided with: three bolt insertion holes (not shown) arrayed on a straight line so as to correspond to the first screw hole 14 and two of the second screw holes 15; and two positioning projections (not shown) inserted in the positioning holes 16.

Fixation of the rotation-unit attachment member 20 to the stage 13a, which is the output portion of the third linear motion actuator 13, is performed in the following procedures. First, the two positioning projections of the rotation-unit attachment member 20 are engaged with two of the positioning holes 16 of the stage 13a. Accordingly, the angle, in a front view, of the rotation-unit attachment member 20 relative to the stage 13a is determined.

As shown in FIG. 1, in this state, attachment bolts 24 are inserted in the three bolt insertion holes of the rotation-unit attachment member 20, and then, the respective attachment bolts 24 are screwed into the first screw hole 14 and the two second screw holes 15 of the stage 13a. Accordingly, the rotation-unit attachment member 20 is fixed to the stage 13a. By changing the positioning holes 16 of the stage 13a with which the positioning projections of the rotation-unit attachment member 20 are to be engaged, the attachment angle of the base portion of the rotation unit 4 relative to the output portion of the linear motion unit 3 can be changed.

Effects of the work device 1 will be described.

In this configuration, the position of the end effector 5 is determined mainly by the linear motion unit 3 having three degrees of freedom, and the posture of the end effector 5 is determined by the rotation unit 4 having three degrees of freedom. The first to third linear motion actuators 11, 12 and 13 of the linear motion unit 3, and the first to third rotation mechanisms 21, 22 and 23 of the rotation unit 4, correspond to a position and a posture of the end effector 5 expressed in a rectangular coordinate system. Therefore, motions of the first to third linear motion actuators 11, 12 and 13 and the first to third rotation mechanisms 21, 22 and 23 corresponding to the position and the posture of the end effector 5, respectively are easily imagined, and motion pattern setting such as a posture teaching work is easily performed.

In addition, the motion positions of the first to third linear motion actuators 11, 12 and 13, and the motion angles of the first to third rotation mechanisms 21, 22 and 23 are uniquely determined correspondingly to the position and the posture of the end effector 5. That is, no singularity is generated. Owing to these features, it is easy to imagine in what direction the distal end is to move upon when each axis is manipulated during teaching being performed. Thus, the work device 1 can be manipulated even without knowledge or experience abundantly gained over time.

In a case where a delicate work such as an assembling work is performed on the workpiece 7 by the end effector 5, the work can be performed mainly by moving only the rotation unit 4. Therefore, the motion amount of the linear motion unit 3 can be made small, and thus, the range of possible movement of the entire device can be made small. In addition, the area of a region, in which a barrier needs to be provided, can be made small.

Since the position of the end effector 5 is determined by the first to third linear motion actuators 11, 12 and 13, linear motion of the end effector 5 can be accurately performed at high speed. In addition, since the first to third linear motion actuators 11, 12 and 13 are used at areas that greatly influence the range of possible movement, the motion range can be easily restricted with use of a mechanical stopper, a limit sensor or the like in accordance with the type of the work and the ambient environment.

Since the first to third linear motion actuators 11, 12 and 13 of the linear motion unit 3 are disposed so as to face outward relative to the work space S, the work space S can be made wider.

Since the linear motion unit 3 and the rotation unit 4 are separately provided, only one of the units may be changed in a case where the specifications of the work device 1 are changed. For example, the form of the rotation unit 4 may be changed from the form shown in FIGS. 3A and 3B to, for example, a form shown in FIG. 5, a form shown in FIG. 12 or a form shown in FIG. 14 described later. Accordingly, the same components can be used among work devices 1 that are different in specifications from one another.

Furthermore, the rotation-unit attachment member 20, which is the base portion of the rotation unit 4, is attached to the stage 13a, of the third linear motion actuator 13, which is the output portion of the linear motion unit 3, such that the attachment angle can be changed by means of the attachment bolts 24. Thus, the configuration of the device can be easily changed in accordance with the type of the work and the ambient environment.

As described above, the work device 1 can coexist with humans since the motion amount of the entire device at the time of a delicate work is small. That is, a work similar to a manual work that is performed by a human can be automatically performed. In addition, a setup changeover time period and an adjustment time period can be shortened, and high-speed motion can be performed, whereby the productivity can be improved.

In order for the work device 1 and humans to coexist, it is desirable to provide a barrier (not shown) such as a cover for covering the work device 1. Since the range of possible movement of the work device 1 is determined mainly by the first to third linear motion actuators 11, 12 and 13, the barrier can have a simple shape such as that of a rectangular parallelepiped. In this case, the volume of an internal space of the barrier and the volume of a region within which the movable portion of the device is movable is approximately equal to each other. Therefore, a compact configuration can be obtained even if the barrier is provided.

Figure 4:
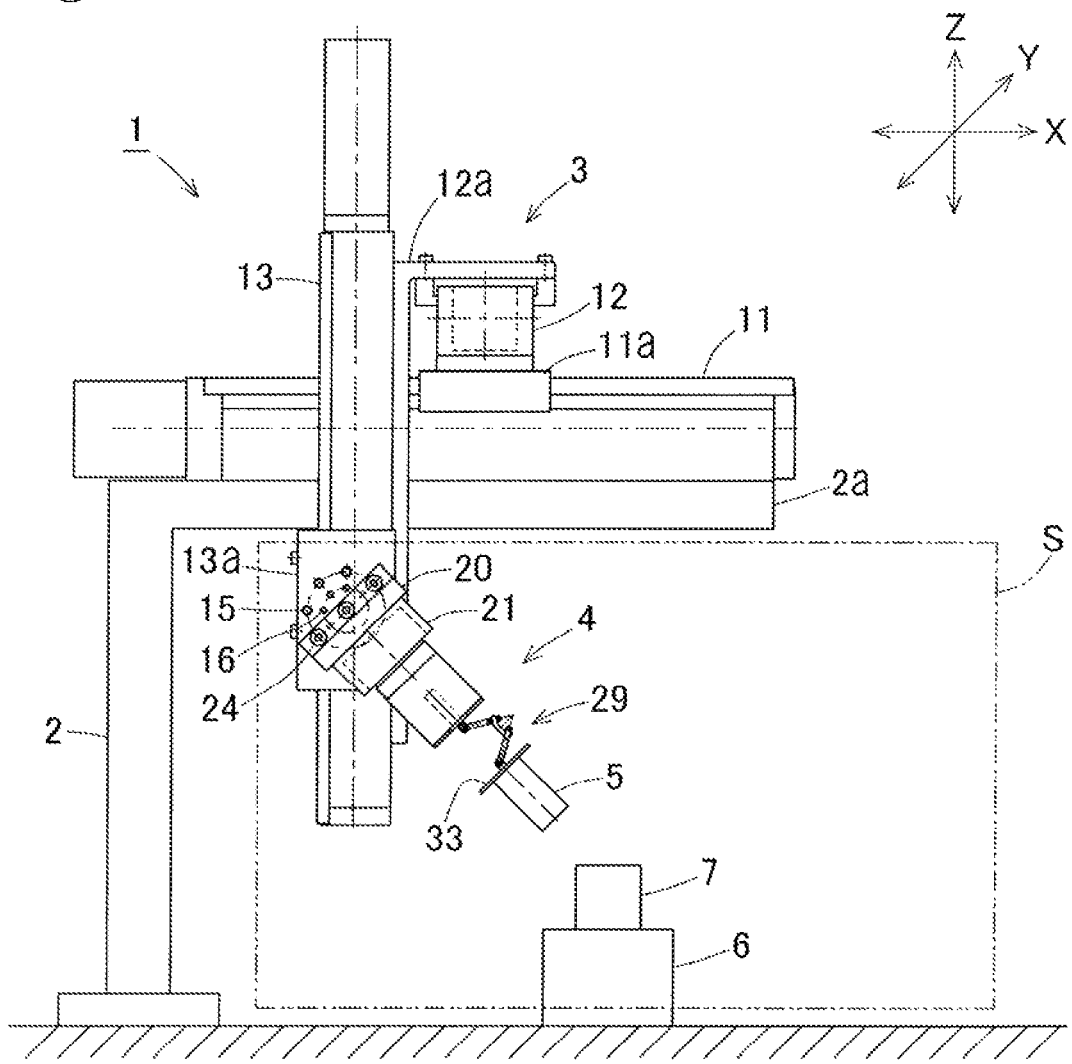
FIG. 4 is a front view showing a schematic configuration of a work device according to a second embodiment of the present invention.

FIG. 4 to FIG. 9 show a second embodiment of the present invention. As shown in FIG. 4, the rotation unit 4 in the work device 1 includes a first rotation mechanism 21, which is a rotation mechanism having one degree of freedom, and a second rotation mechanism which is a link actuation device 29 having two degrees of freedom. That is, the second rotation mechanism 22 and the third rotation mechanism 23 in the first embodiment shown in FIG. 1 are replaced by the link actuation device 29. The first rotation mechanism 21 corresponds to "another rotation mechanism other than the link actuation device 29". The other structures are the same as those of the first embodiment in FIG. 1.

Figure 5:
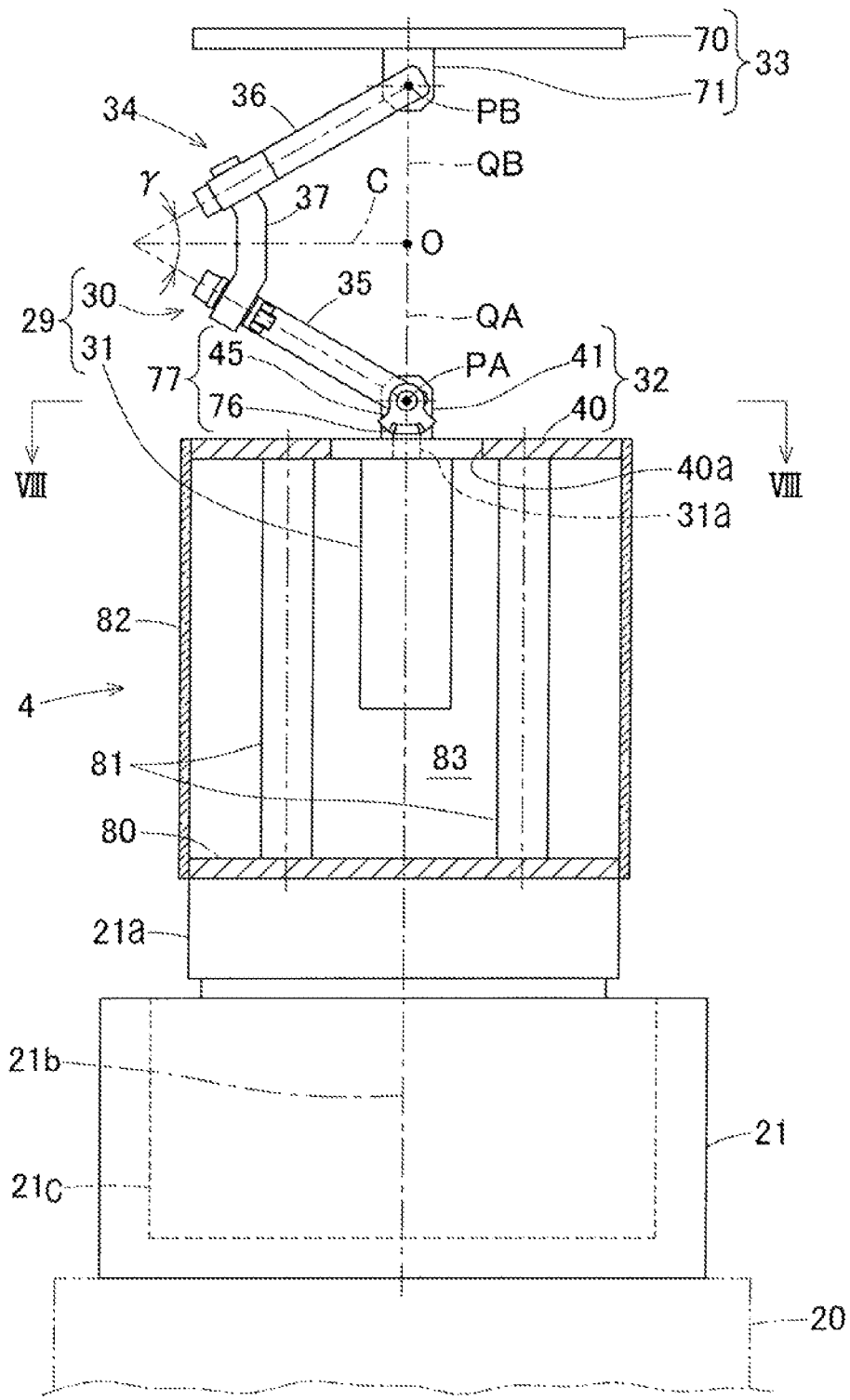
FIG. 5 is a front view of a rotation unit of the work device with a part thereof being shown in section.
Figure 6:
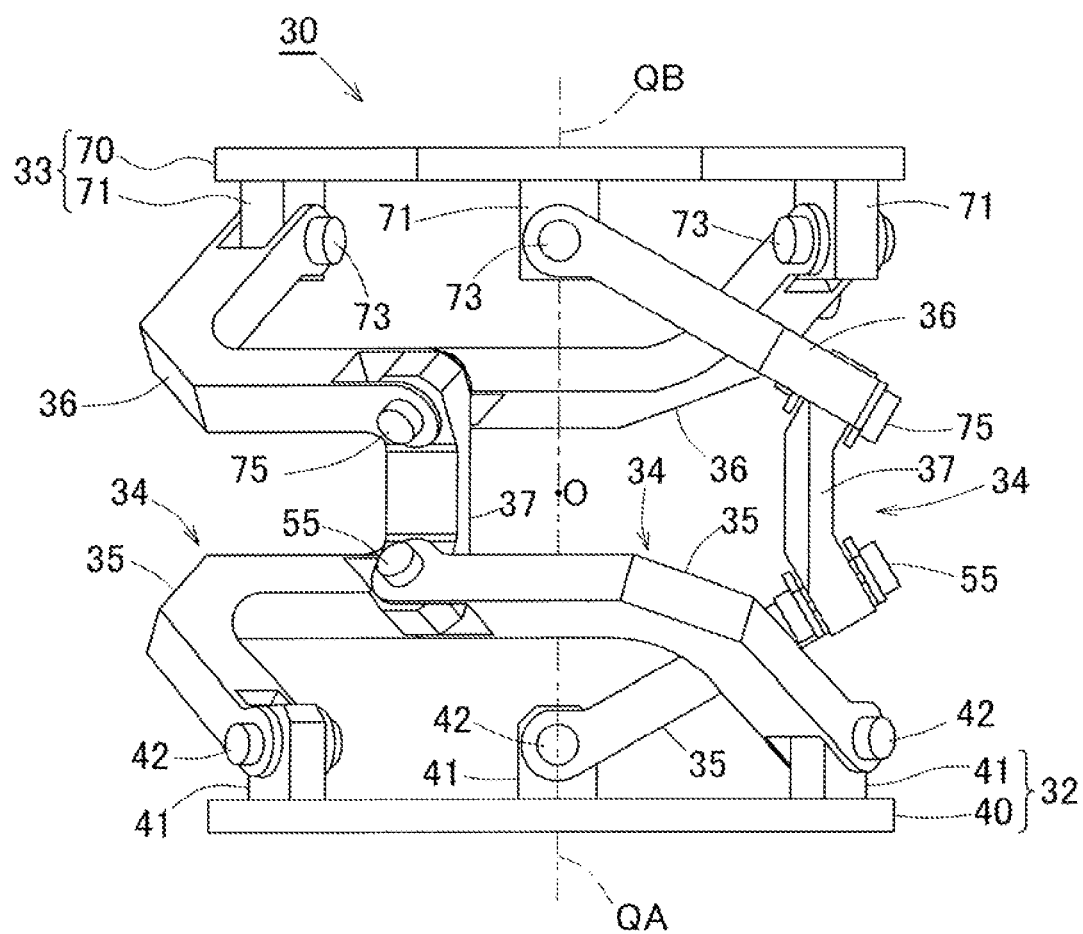
FIG. 6 is a perspective view of a parallel link mechanism of a link actuation device of the rotation unit.
Figure 7:
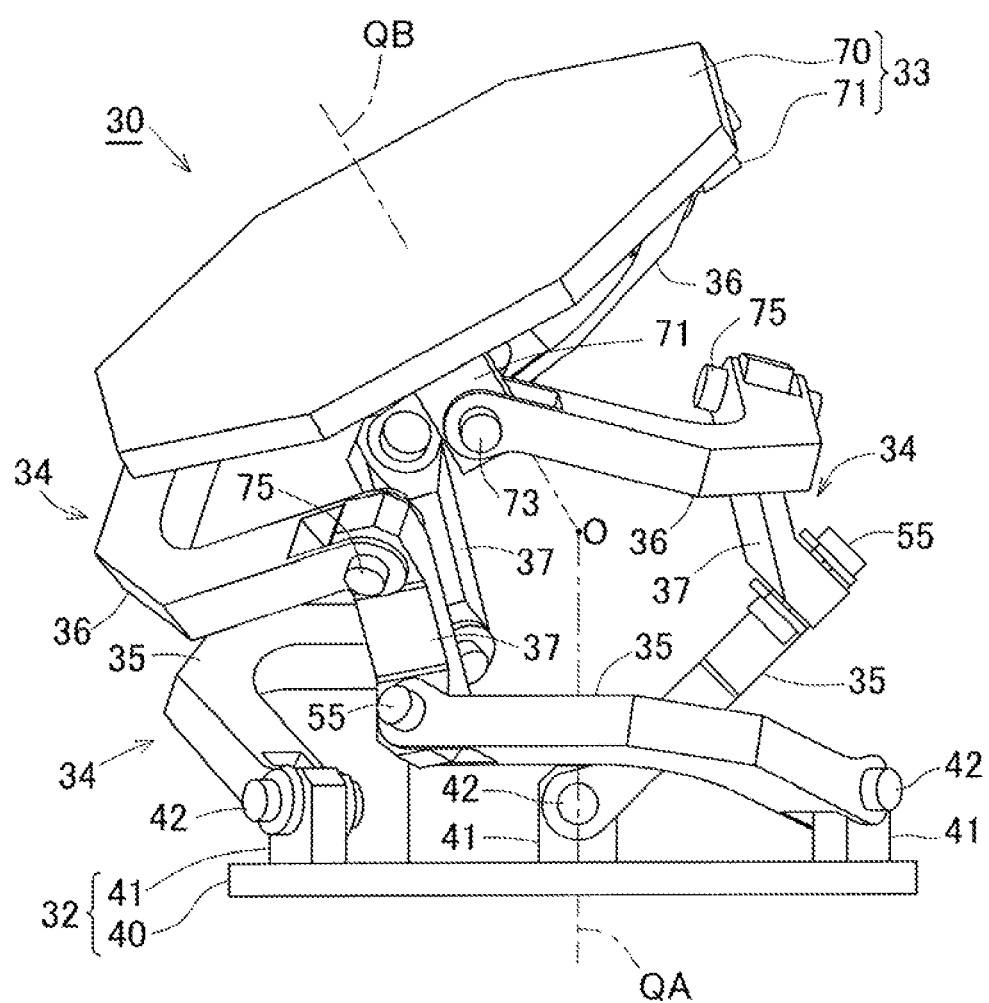
FIG. 7 is a perspective view of the parallel link mechanism in a different state.

As shown in FIG. 5, the link actuation device 29 includes a parallel link mechanism 30 and a posture-controlling actuator 31 which actuates the parallel link mechanism 30. FIG. 6 and FIG. 7 are perspective views of the parallel link mechanism 30, and show states that are different from each other. As shown in FIG. 5 to FIG. 7, the parallel link mechanism 30 includes: a proximal-end-side link hub 32; a distal-end-side link hub 33; and three link mechanisms 34 with which the distal-end-side link hub 33 is connected to the proximal-end-side link hub 32 so as to be changeable in posture relative to the proximal-end-side link hub 32. FIG. 5 shows only one of the link mechanisms 34. The number of the link mechanisms 34 may be four or more.

Each link mechanism 34 is a quadric chain link mechanism having four revolute pairs, which mechanism 34 includes a proximal-side end link member 35, a distal-side end link member 36, and a center link member 37. The proximal-side and distal-side end link members 35 and 36 are L-shaped. One end of the proximal-side end link member 35 is rotatably connected to the proximal-end-side link hub 32, and one end of the distal-side end link member 36 is rotatably connected to the distal-end-side link hub 33. The center link member 37 has opposed ends to which the other ends of the proximal-side and distal-side end link members 35 and 36 are rotatably connected, respectively.

The parallel link mechanism 30 has a structure obtained by combining two spherical link mechanisms, in which the central axis of a revolute pair between the proximal-end-side link hub 32 and the proximal-side end link member 35 and the central axis of a revolute pair between the proximal-side end link member 35 and the center link member 37, intersect with each other at a proximal-end-side spherical link center PA (FIG. 5). On the other hand, the central axis of a revolute pair between the distal-end-side link hub 33 and the distal-side end link member 36 and the central axis of a revolute pair between the distal-side end link member 36 and the center link member 37, intersect with each other at a distal-end-side spherical link center PB (FIG. 5).

The distances to the proximal-end-side spherical link center PA from the respective revolute pairs between the proximal-end-side link hub 32 and the proximal-side end link members 35 are equal to one another, and the distances to the proximal-end-side spherical link center PA from the respective revolute pairs between the proximal-side end link members 35 and the center link members 37 are also equal to one another. Similarly, the distances to the distal-end-side spherical link center PB from the respective revolute pairs between the distal-end-side link hub 33 and the distal-side end link members 36 are equal to one another, and the distances to the distal-end-side spherical link center PB from the respective revolute pairs between the distal-side end link members 36 and the center link members 37 are also equal to one another. The central axes of the respective revolute pairs between the proximal-side and distal-side end link members 35, 36 and the center link member 37 may intersect with each other at an intersection angle γ (FIG. 5), or may be parallel to each other.

Figure 8:
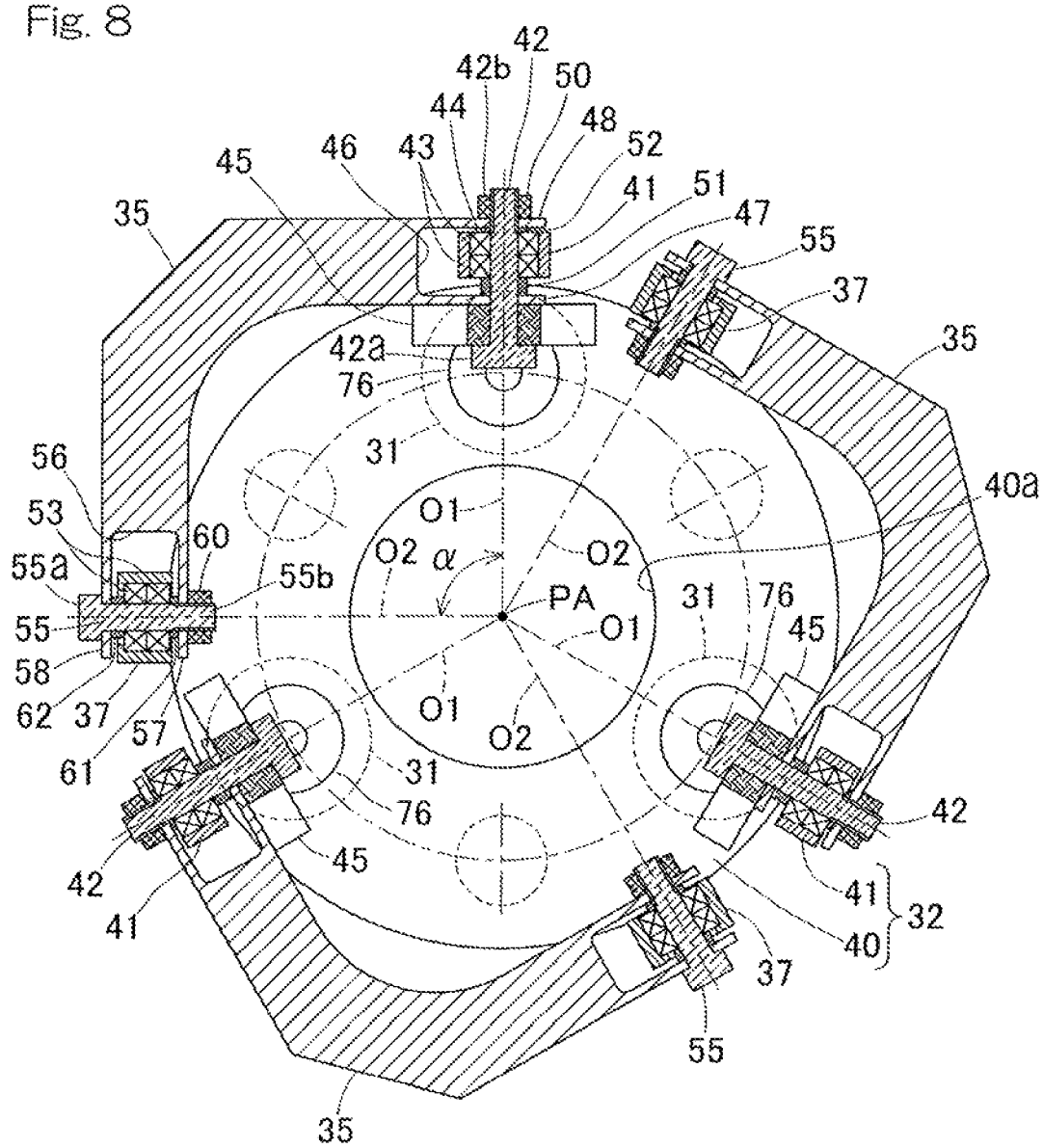
FIG. 8 is a cross-sectional view taken along a line VIII-VIII in FIG. 5.

FIG. 8 is a cross-sectional view taken along a line VIII-VIII in FIG. 5. FIG. 8 shows the relationship among a central axis O1 of the revolute pair between the proximal-end-side link hub 32 and each proximal-side end link member 35, a central axis O2 of the revolute pair between the proximal-side end link member 35 and the corresponding center link member 37, and the proximal-end-side spherical link center PA. That is, a point, at which the central axis O1 and the central axis O2 intersect with each other, is the proximal-end-side spherical link center PA.

The positional relationship and the shapes of the distal-end-side link hub 33 and the distal-side end link members 36, are the same (not shown) as those in FIG. 8. In FIG. 8, an angle α is 90°, the angle α being formed by: the central axis O1 of the revolute pair between the link hub 32 (33) and the end link member 35 (36); and the central axis O2 of the revolute pair between the end link member 35 (36) and the center link member 37. However, the angle α may be other than 90°.

Figure 9:
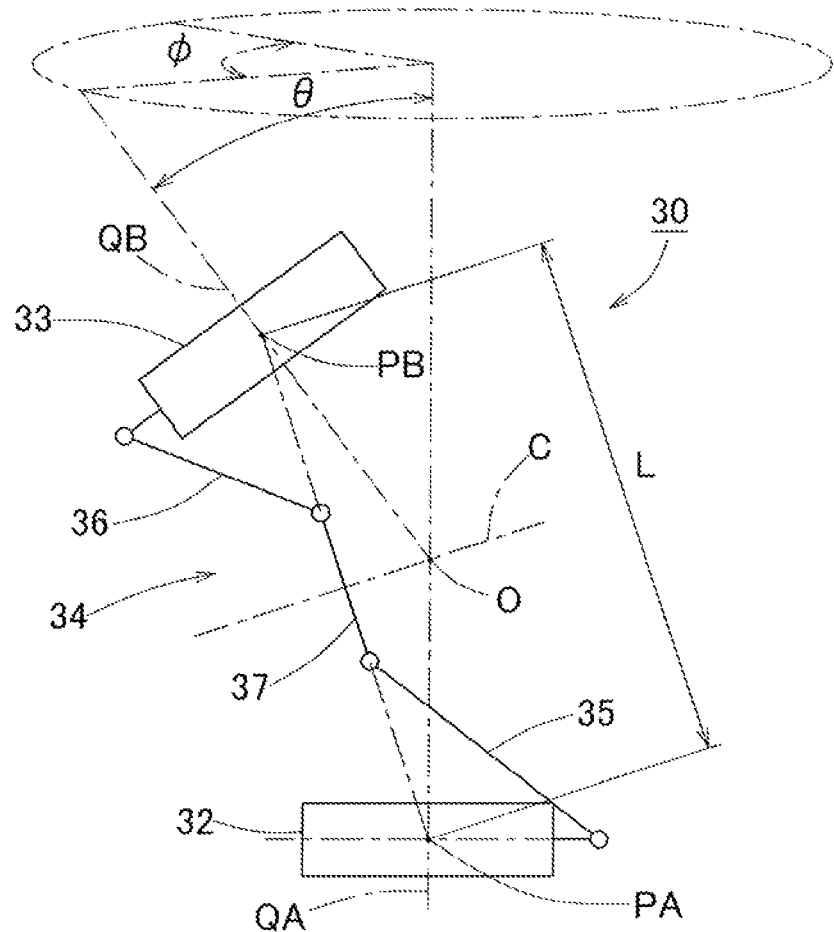
FIG. 9 is a view in which one link mechanism of the link actuation device is expressed with straight lines.

The three link mechanisms 34 have geometrically identical forms. The term "geometrically identical forms" intends to mean that, as shown in FIG. 9, a geometric model depicted with straight lines that represent the link members

35, 36, and 37, i.e., a model depicted with the revolute pairs and straight lines connecting the revolute pairs to each other, has such a shape that a proximal-end-side portion thereof and a distal-end-side portion thereof are symmetric with each other relative to a center portion of the center link member 37. FIG. 9 is a view in which one of the link mechanisms 34 is expressed with straight lines.

The parallel link mechanism 30 in the present embodiment is of a rotation symmetrical type. That is, a positional relationship is established in which a proximal side portion composed of the proximal-end-side link hub 32 and the proximal-side end link member 35 is rotationally symmetric, about a center line C of the center link member 37, with a distal side portion composed of the distal-end-side link hub 33 and the distal-side end link member 36. The center portions of the center link members 37 are located on the same orbital circle.

The proximal-end-side link hub 32, the distal-end-side link hub 33 and the three link mechanisms 34 cooperate together to form a mechanism having two degrees of freedom, in which the distal-end-side link hub 33 is rotatable, about orthogonal two axes, relative to the proximal-end-side link hub 32. In other words, in the mechanism, the posture of the distal-end-side link hub 33 is changeable relative to that of the proximal-end-side link hub 32 with two degrees of rotational freedom. This mechanism having two degrees of freedom is compact but provides a wide range of possible movement of the distal-end-side link hub 33 relative to the proximal-end-side link hub 32.

For example, in the proximal end side and the distal end side, a straight line that passes the spherical link center PA, PB and that intersects, at the right angle, with the central axis O1 (FIG. 8) of the revolute pair between the link hub 32, 33 and each end link member 35, 36, is defined as a central axis QA, QB of the link hub 32, 33. In this case, the maximum value of a bend angle θ (FIG. 9) formed by the central axis QA of the proximal-end-side link hub 32 and the central axis QB of the distal-end-side link hub 33 can be set to about ±90°. In addition, an angle of traverse φ (FIG. 9) of the distal-end-side link hub 33 relative to the proximal-end-side link hub 32 can be set to a range of 0° to 360°. The bend angle θ refers to a vertical angle formed when the central axis QB of the distal-end-side link hub 33 is tilted relative to the central axis QA of the proximal-end-side link hub 32. The angle of traverse φ refers to a horizontal angle formed when the central axis QB of the distal-end-side link hub 33 is tilted around the central axis QA of the proximal-end-side link hub 32.

Change of the posture of the distal-end-side link hub 33 relative to the proximal-end-side link hub 32 is performed with, as a rotation center, an intersection point O of the central axis QA of the proximal-end-side link hub 32 and the central axis QB of the distal-end-side link hub 33. FIG. 6 shows a state where the central axis QA of the proximal-end-side link hub 32 and the central axis QB of the distal-end-side link hub 33 are on the same line. On the other hand, FIG. 7 shows a state where the central axis QB of the distal-end-side link hub 33 is tilted at a certain operating angle relative to the central axis QA of the proximal-end-side link hub 32. Even if the posture is changed, a distance L (FIG. 9) between the proximal-end-side and distal-end-side spherical link centers PA and PB is unchanged.

In a case where the link mechanisms 34 satisfy the following conditions 1 to 5, the proximal side portion composed of the proximal-end-side link hub 32 and the proximal-side end link members 35, and the distal side portion composed of the distal-end-side link hub 33 and the distal-side end link members 36, move in the same manner owing to geometrical symmetry. Accordingly, when transmitting rotation from the proximal end side to the distal end side, the parallel link mechanism 30 functions as a constant velocity universal joint that is rotated at a constant velocity with the same rotation angle being formed on the proximal end side and the distal end side.

Condition 1: on the proximal end side and the distal end side, the angles formed by the central axes O1 of the revolute pairs between the link hubs 32, 33 and the end link members 35, 36 in the respective link mechanisms 34 are equal to one another, and the lengths of these central axes O1 are equal to one another.

Condition 2: the central axes O1 of the revolute pairs between the link hubs 32, 33 and the end link members 35, 36, and the central axes O2 of the revolute pairs between the end link members 35, 36 and the center link members 37, intersect with each other at the spherical link centers PA and PB on the proximal end side and the distal end side.

Condition 3: each proximal-side end link member 35 and each distal-side end link member 36 have geometrically identical forms.

Condition 4: the proximal-end-side portion and the distal-end-side portion of each center link member 37 have geometrically identical forms.

Condition 5: relative to a symmetry plane of each center link member 37, the angular positional relationships between the center link member 37 and the end link members 35 and 36 are the same with each other on the proximal end side and the distal end side.

As shown in FIG. 5 to FIG. 7, the proximal-end-side link hub 32 includes a proximal-end member 40 and three rotational shaft connection members 41 provided integrally with the proximal-end member 40. As shown in FIG. 8, a circular through hole 40 is formed at a center portion of the proximal-end member 40, and three rotational shaft connection members 41 are arranged around the through hole 40a at equal intervals in the circumferential direction. The center of the through hole 40a is located on the central axis QA (FIG. 5) of the proximal-end-side link hub 32. To each rotational shaft connection member 41, a rotational shaft 42 is rotatably connected such that the axis thereof intersects with the central axis QA of the proximal-end-side link hub 32. One end of the proximal-side end link member 35 is connected to the rotational shaft 42.

The rotational shaft 42 is rotatably supported by the rotational shaft connection member 41 via two bearings 43. As the bearings 43, ball bearings such as deep groove ball bearings or angular contact ball bearings are used, for example. The bearings 43 are disposed in a hollow hole 44 of the tubular rotational shaft connection member 41 in a fitted state, and are fixed by a method such as press-fitting, adhesion or crimping. The types of the bearings provided to the other revolute pair portions, and a disposing method for these bearings are the same as above.

The one end of the proximal-side end link member 35 and a fan-shaped bevel gear 45 (described later) are joined to the rotational shaft 42, and are both rotated integrally with the rotational shaft 42. Specifically, a cut portion 46 is formed at the one end of the proximal-side end link member 35, and the rotational shaft connection member 41 is disposed between inner-side and outer-side rotational shaft support portions 47 and 48 which are both-side portions of the cut portion 46. The bevel gear 45 is disposed so as to be in contact with the inner surface of the inner-side rotational shaft support portion 47.

In order from the inner side, the rotational shaft 42 is inserted through: a through hole formed in the bevel gear 45; a through hole formed in the inner-side rotational shaft support portion 47; an inner ring of each bearing 43; and a through hole formed in the outer-side rotational shaft support portion 48. Thereafter, the bevel gear 45, the inner-side and outer-side rotational shaft support portions 47 and 48, and the inner ring of the bearing 43 are sandwiched and joined by a head portion 42a of the rotational shaft 42 and a nut 50 screwed onto a screw portion 42b of the rotational shaft 42. Spacers 51 and 52 are interposed between the bearing 43 and the inner-side and outer-side rotational shaft support portions 47 and 48, and a preload is applied to the bearing 43 when the nut 50 is screwed.

A rotational shaft 55 is joined to the other end of the proximal-side end link member 35. The rotational shaft 55 is rotatably connected to one end of the center link member 37 via two bearings 53. Specifically, a cut portion 56 is formed at the other end of the proximal-side end link member 35, and the one end of the center link member 37 is disposed between inner-side and outer-side rotational shaft support portions 57 and 58 which are both-side portions of the cut portion 56.

In order from the outer side, the rotational shaft 55 is inserted through: a through hole formed in the outer-side rotational shaft support portion 58; an inner ring of each bearing 53; and a through hole formed in the inner-side rotational shaft support portion 57. Thereafter, the inner-side and outer-side rotational shaft support portions 57 and 58 and the inner ring of the bearing 53 are sandwiched and joined by a head portion 55a of the rotational shaft 55 and a nut 60 screwed onto a screw portion 55b of the rotational shaft 55. Spacers 61 and 62 are interposed between the bearing 53 and the inner-side and outer-side rotational shaft support portions 57 and 58, and preload is applied to the bearing 53 when the nut 60 is screwed.

As shown in FIG. 6 and FIG. 7, the distal-end-side link hub 33 includes a distal end member 70 and three rotational shaft connection members 71 provided on the inner surface of the distal end member 70 so as to be arranged at equal interval in the circumferential direction. The center of a circle, along which the rotational shaft connection members 71 are arranged, is located on the central axis QB of the distal-end-side link hub 33. To each rotational shaft connection member 71, a rotational shaft 73 is rotatably connected such that the axis thereof intersects with the central axis QB of the link hub. One end of the distal-side end link member 36 is connected to the rotational shaft 73 of the distal-end-side link hub 33.

A rotational shaft 75 rotatably connected to the other end of the center link member 37 is connected to the other end of the distal-side end link member 36. Similarly to the above-described rotational shafts 42 and 55, the rotational shaft 73 of the distal-end-side link hub 33 and the rotational shaft 75 of the center link member 37 are rotatably connected to the rotational shaft connection member 71 and the other end of the center link member 37, respectively, via two bearings (not shown).

As shown in FIG. 5, the parallel link mechanism 30 is disposed on the first rotation mechanism 21 by connecting the proximal-end member 40 to a base member 80 via a plurality of shafts 81. The central axis QA of the proximal-end-side link hub 32 and the rotation axis 21b of the first rotation mechanism 21 are located on the same line. The base member 80 is fixed to the rotating portion 21a of the first rotation mechanism 21. A cover 82 is disposed between the outer circumferential edge of the proximal-end member 40 and the outer circumferential edge of the base member 80. A portion between the proximal-end member 40 and the base member 80 is a shielded space 83 shielded from the outside by the cover 82.

The posture-controlling actuator 31 for actuating the parallel link mechanism 30 is disposed in the shielded space 83, and is attached to the proximal-end member 40. The number of the posture-controlling actuators 31 is equal to that of the link mechanisms 34, i.e., three. Each posture-controlling actuator 31 is implemented by, for example, a rotary actuator such as a motor. A bevel gear 76 attached to a rotational output shaft 31a of the posture-controlling actuator 31 and the fan-shaped bevel gear 45 attached to the rotational shaft 42 of the proximal-end-side link hub 32, mesh with each other. That is, the bevel gear 76 and the fan-shaped bevel gear 45 cooperate to form a speed reducer 77 of axis-orthogonal configuration. Notedly, a mechanism other than the bevel gears (e.g., a worm mechanism) may be used to form the speed reducer of axis-orthogonal configuration.

Although the posture-controlling actuators 31 equal in number to the link mechanisms 34 are provided in the second embodiment, the posture-controlling actuators 31 only have to be provided to at least two of the three link mechanisms 34. As long as this is satisfied, the posture of the distal-end-side link hub 33 relative to the proximal-end-side link hub 32 can be determined.

The link actuation device 29 rotationally drives each posture-controlling actuator 31, thereby actuating the parallel link mechanism 30. Specifically, when the posture-controlling actuator 31 is rotationally driven, the rotation thereof is transmitted to the rotational shaft 42 while being reduced in speed via the speed reducer 77 of axis-orthogonal configuration. By so doing, the angle of the proximal-side end link member 35 relative to the proximal-end-side link hub 32 is changed. Accordingly, the position and the posture of the distal-end-side link hub 33 relative to the proximal-end-side link hub 32 are determined. Since the central axis QA of the proximal-end-side link hub 32 and the rotation axis 21b of the first rotation mechanism 21 are located on the same line, calculation of coordinates is easily performed.

In addition, since the central axis QA of the proximal-end-side link hub 32 and the rotation axis 21b of the first rotation mechanism 21 are located on the same line, a worker can easily imagine the motion of the work device 1, and thus, can easily manipulate the work device 1. For example, in a state where positions in three degrees of freedom determined by the linear motion unit 3 are fixed, and angles in two degrees of freedom among angles in three degrees of freedom determined by the rotation unit 4 are fixed, a work can be performed while the posture of the end effector 5 is being changed by changing only the angle in the remaining one degree of freedom (e.g., an angle about the central axis QB of the distal-end-side link hub 33).

As described above, the link actuation device 29 has a wide range of possible movement, and is capable of smooth motion. Thus, if the rotation unit 4 includes the link actuation device 29, a delicate work can be performed at high speed. In addition, since the link actuation device 29 has a compact configuration but has a wide range of possible movement, the entire work device 1 has a compact configuration.

In the second embodiment, the first rotation mechanism 21 is disposed at the proximal end side of the link actuation device 29 and the end effector 5 is mounted to the distal-end-side link hub 33. Accordingly, load on the link actuation device 29 can be reduced, and thus, the link actuation device 29 can be made compact and can be reduced in weight. The parallel link mechanism 30 of the link actuation device 29 functions as a constant velocity universal joint. Therefore, owing to coordinated control of the link actuation device 29 and the first rotation mechanism 21, a work can be easily performed while the posture of the end effector 5 is being changed in terms of only the angle about the central axis QB of the distal-end-side link hub 33. However, a cable that is connected to each posture-controlling actuator 31 needs to be taken into consideration, and thus, the rotation angle is restricted.

Figure 10:
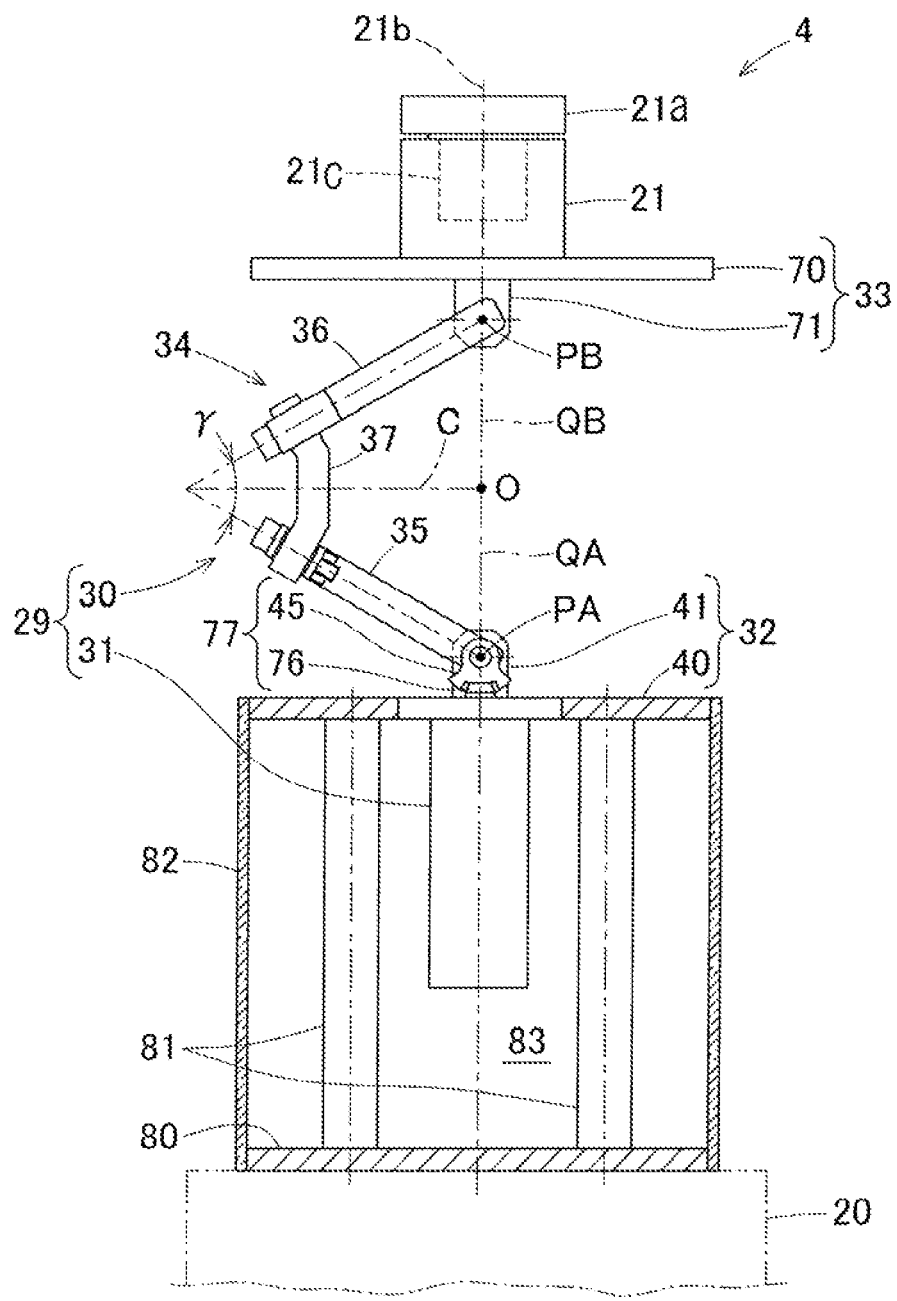
FIG. 10 is a front view of a rotation unit of a work device according to a third embodiment of the present invention.

In a third embodiment shown in FIG. 10, a rotation unit 4 is provided in which the order of the first rotation mechanism 21 and the link actuation device 29 is reversed relative to that in the second embodiment in FIG. 5. In the case of the third embodiment, the central axis QB of the distal-end-side link hub 33 of the link actuation device 29 and the rotation axis 21b of the first rotation mechanism 21 are located on the same line. The other configurations are the same as those in the second embodiment shown in FIG. 5.

With the rotation unit 4 in the third embodiment, wiring of a cable to be connected to each posture-controlling actuator 31 is easily performed, and the rotation angle is less likely to be restricted. However, a disadvantage arises that load on the link actuation device 29 increases. Except the disadvantage, the same operations and effects as those in the second embodiment shown in FIG. 5 are obtained.

Figure 11:
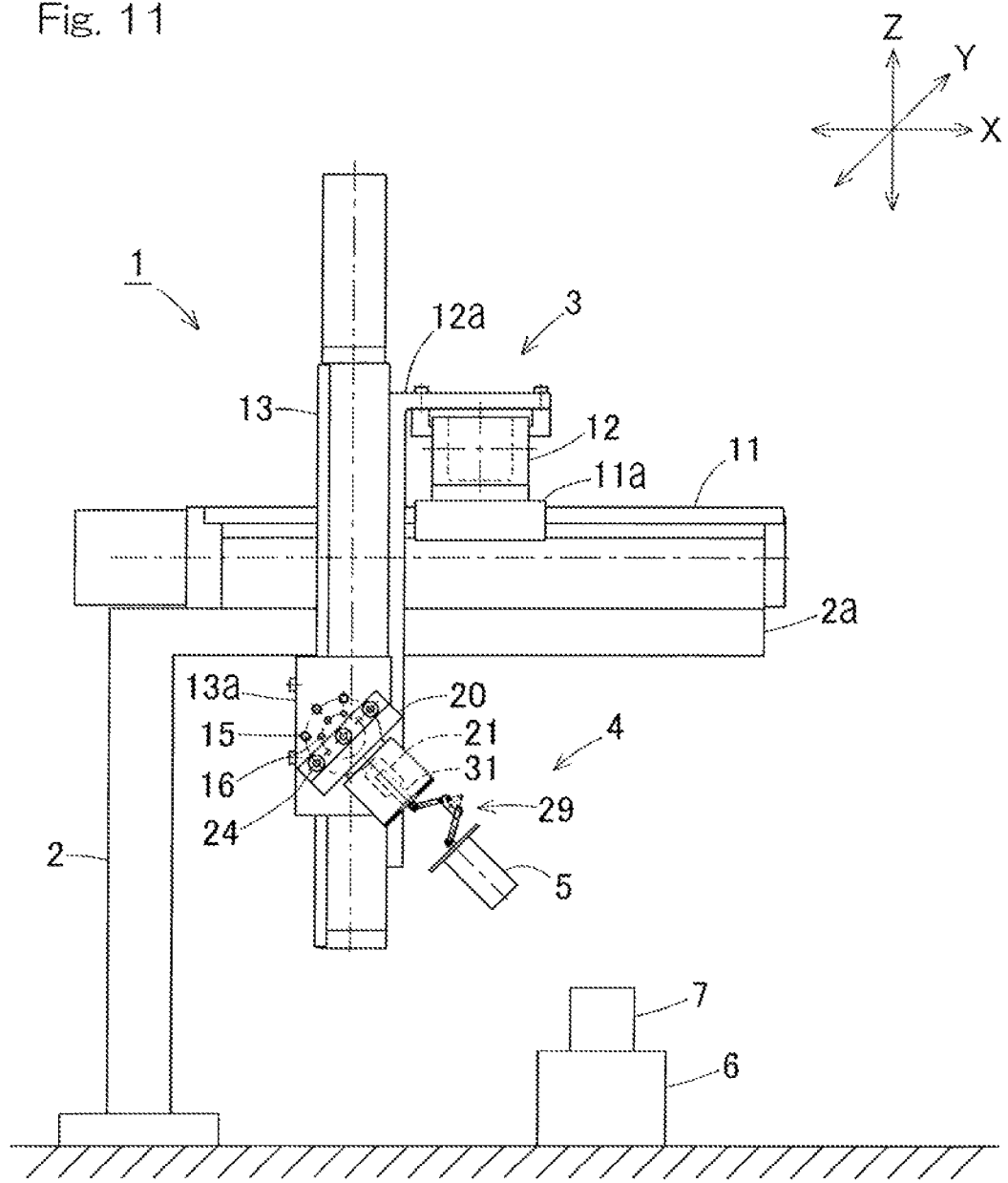
FIG. 11 is a view showing a schematic configuration of a work device according to a fourth embodiment of the present invention.
Figure 12:
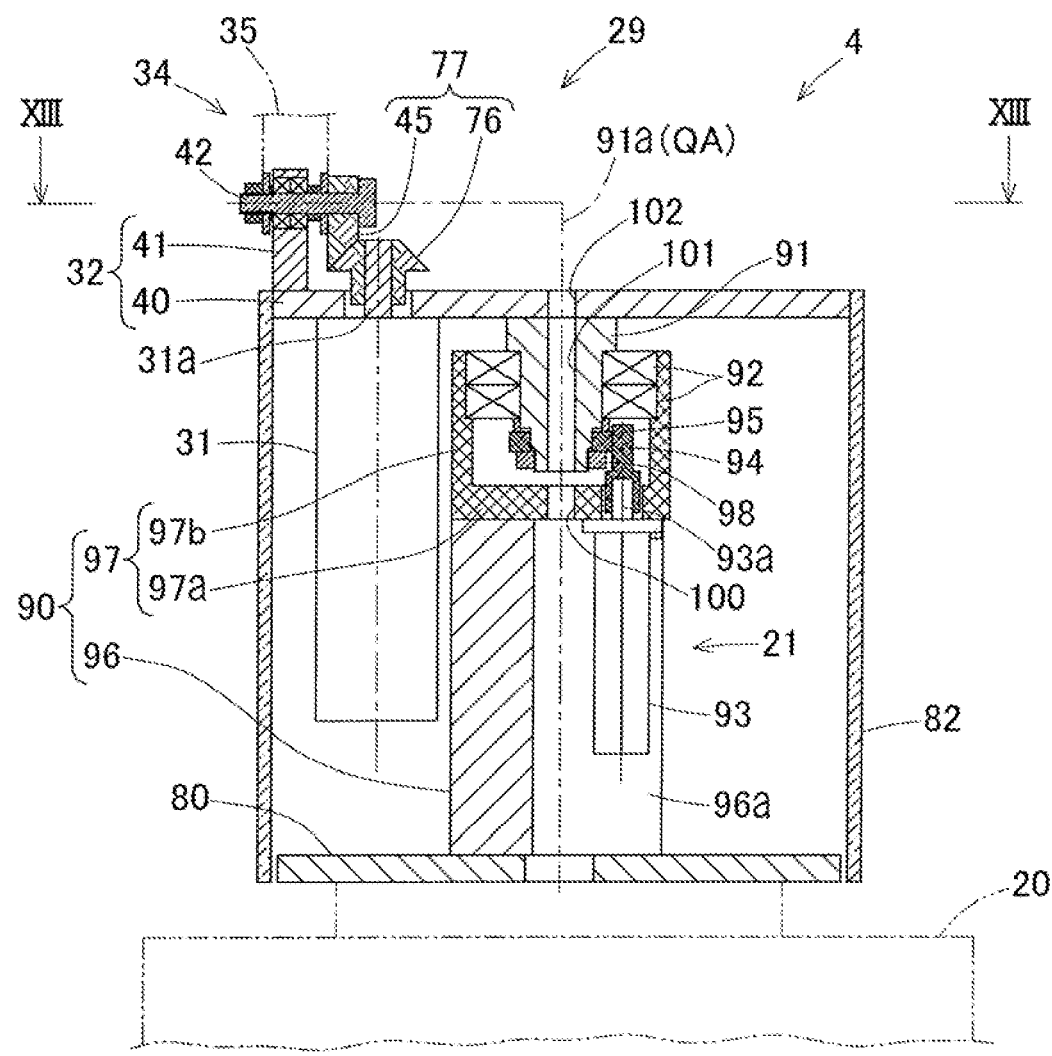
FIG. 12 is a front view of a main portion of a rotation unit of the work device.
Figure 13:
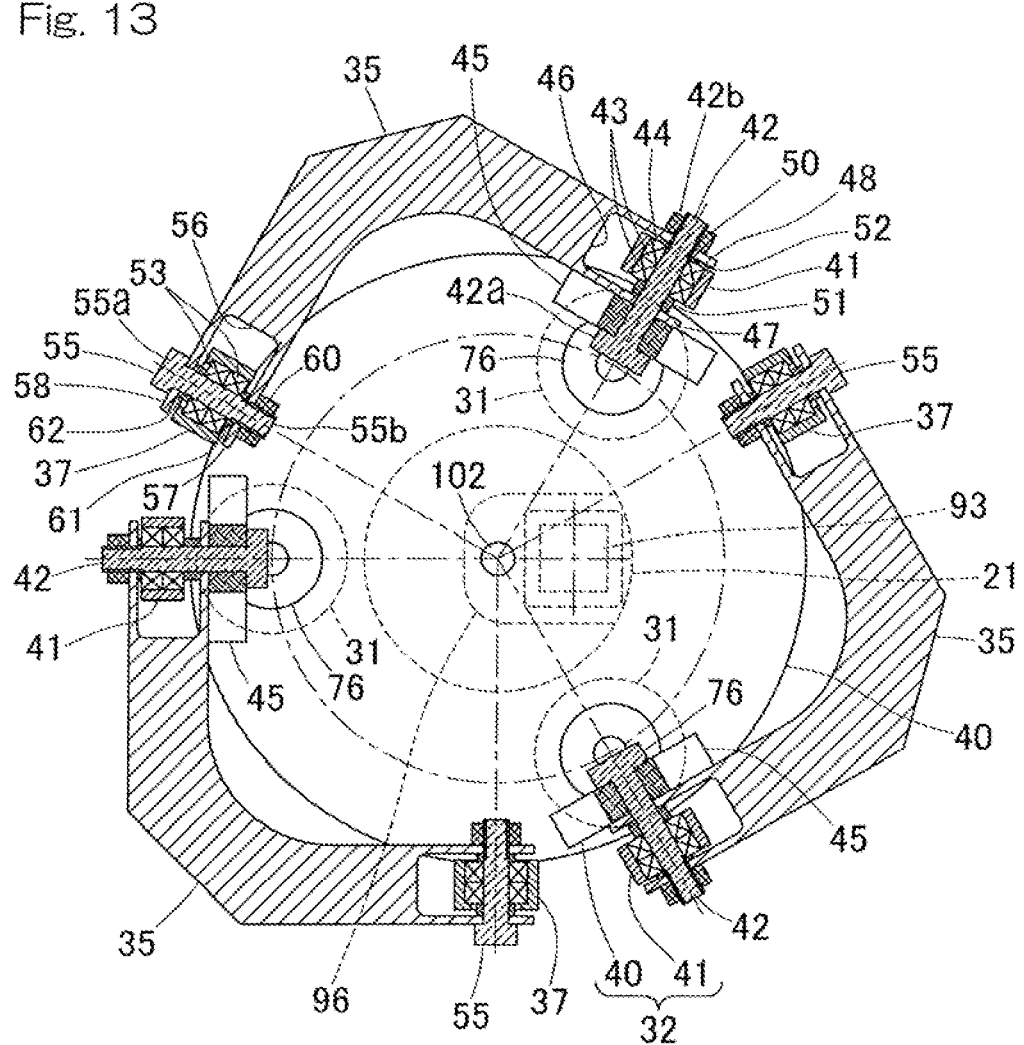
FIG. 13 is a cross-sectional view taken along a line XIII-XIII in FIG. 12.

FIG. 11 to FIG. 13 show a fourth embodiment of the present invention. As shown in FIG. 11, the rotation unit 4 in this work device 1 includes the first rotation mechanism 21, which is a rotation mechanism having one degree of freedom, and the link actuation device 29, which is a rotation mechanism having two degrees of freedom, as in the second embodiment shown in FIG. 4. The difference between the work device 1 according to the fourth embodiment and that according to the second embodiment shown in FIG. 4 is that the first rotation mechanism 21 is disposed at a center portion among the posture-controlling actuators 31 of the link actuation device 29.

As shown in FIG. 12, the first rotation mechanism 21 includes: a fixed portion 90 fixed to the base member 80; a rotating portion 91 fixed to the proximal-end member 40 of the link actuation device 29; two bearings 92 supporting the rotating portion 91 such that the rotating portion 91 is rotatable relative to the fixed portion 90; a motor 93, which is a drive source, provided at the fixed portion 90; and a pair of spur gears 94 and 95 through which rotation of the motor 93 is transmitted to the rotating portion 91.

The base member 80 is fixed to the rotation-unit attachment member 20. The fixed portion 90 includes: a first attachment member 96 fixed to the base member 80 and having a horseshoe-shaped cross section; and a second attachment member 97 having a bottom portion 97a fixed to the first attachment member 96. The second attachment member 97 has a tubular portion 97b extending from the outer circumferential edge of the bottom portion 97a to the upper side of FIG. 12. The rotating portion 91 is fixed to the proximal-end member 40 of the proximal-end-side link hub 32 such that a rotation axis 91a of the rotating portion 91 and the central axis QA of the proximal-end-side link hub 32 are on the same line. The two bearings 92 are arranged on the inner circumference of the tubular portion 97b of the second attachment member 97.

The motor 93 is disposed in a recessed portion 96a of the first attachment member 96 having a horseshoe-shaped cross section, and is fixed to the bottom portion 97a of the second attachment member 97. An output shaft 93a of the motor 93 extends upward so as to penetrate the bottom portion 97a of the second attachment member 97, and has an upper end to which the driving-side spur gear 94 is attached. The driving-side spur gear 94 meshes with the driven-side spur gear 95 attached to the rotating portion 91. The driven-side spur gear 95 is fitted to the outer circumference of the rotating portion 91. A screw portion is formed on the lower end of the rotating portion 91, and, by means of a nut 98 screwed onto the screw portion, the spur gear 95 is fastened and fixed to the rotating portion 91.

The bottom portion 97a of the second attachment member 97, the rotating portion 91, and the proximal-end member 40 respectively have wiring holes 100, 101, and 102 penetrating therethrough along the rotation axis 91a of the rotating portion 91. The cover 82 is attached to the outer circumferential edge of the proximal-end member 40 so as to extend to an area near the outer circumferential edge of the base member 80. The cover 82 and the base member 80 are not joined to each other.

As in the second embodiment shown in FIG. 5, the three posture-controlling actuators 31 of the link actuation device 29 are arranged on an imaginary circle on the proximal-end member 40, and the rotational drive force of the rotational output shaft 31a of each posture-controlling actuator 31 is transmitted to the link mechanism 34 through speed reducer 77 of axis-orthogonal configuration. With such arrangement of the posture-controlling actuators 31, the first rotation mechanism 21 can be disposed at the center portion in the arrangement of the posture-controlling actuators 31, as in the fourth embodiment. Accordingly, the rotation unit 4 has a compact configuration.

When the motor 93 is driven, the entire link actuation device 29 and the cover 82 are rotated together with the rotating portion 91. By inserting a wire through the wiring holes 100, 101, and 102, the wire can be connected from the internal space side of the link actuation device 29 to the end effector 5 without interfering with any of the link mechanisms 34. Thus, the restriction on the wiring of the cable that is connected to each posture-controlling actuator 31 is reduced. The internal space of the link actuation device 29 means a space enclosed by the proximal-end-side link hub 32, the distal-end-side link hub 33 and the link mechanisms 34.

Figure 14:
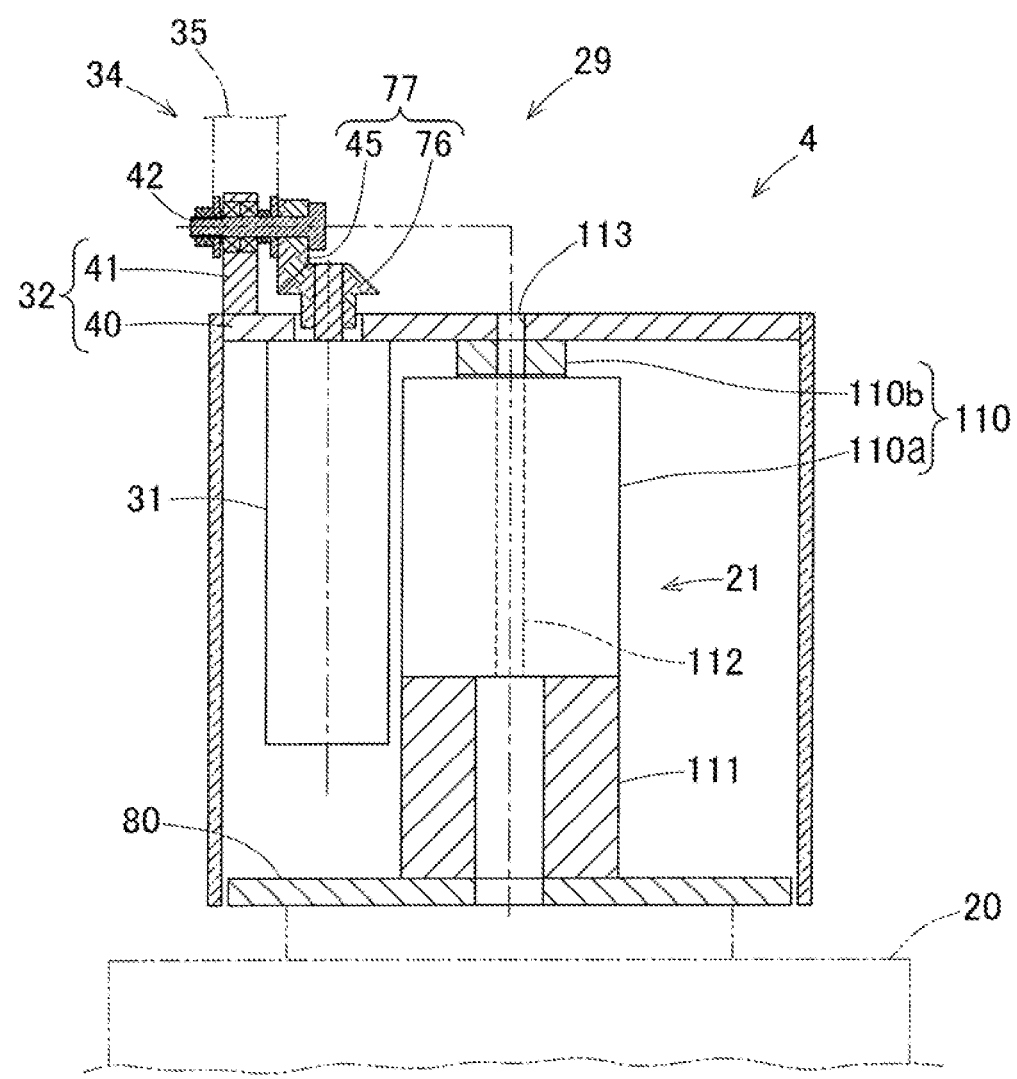
FIG. 14 is a front view of a main portion of a rotation unit of a work device according to a fifth embodiment of the present invention.

FIG. 14 is a front view of a main portion of a rotation unit of a work device according to a fifth embodiment of the present invention. In the rotation unit 4 in the fifth embodiment, the first rotation mechanism 21 is disposed at a center portion among the posture-controlling actuators 31 of the link actuation device 29. In terms of this feature, the fifth embodiment is the same as the fourth embodiment shown in FIG. 12. However, the fifth embodiment is different from the fourth embodiment shown in FIG. 12 in that a hollow shaft motor 110 is used as the drive source of the first rotation mechanism 21.

The hollow shaft motor 110 has a motor body 110a fixed to the base member 80 via a motor attachment member 111. The hollow shaft motor 110 has an output shaft 110b to which the proximal-end member 40 of the proximal-end-side link hub 32 is fixed. The hollow shaft motor 110 has therein a wiring hole 112 penetrating the motor body 110a and the output shaft 110b in the axial direction. Also, the proximal-end member 40 of the proximal-end-side link hub 32 has therein a wiring hole 113 coaxially with the wiring hole 112. The other configurations are the same as those in the fourth embodiment shown in FIG. 12, and the same operations and effects as those in the fourth embodiment are obtained.

Figure 15:
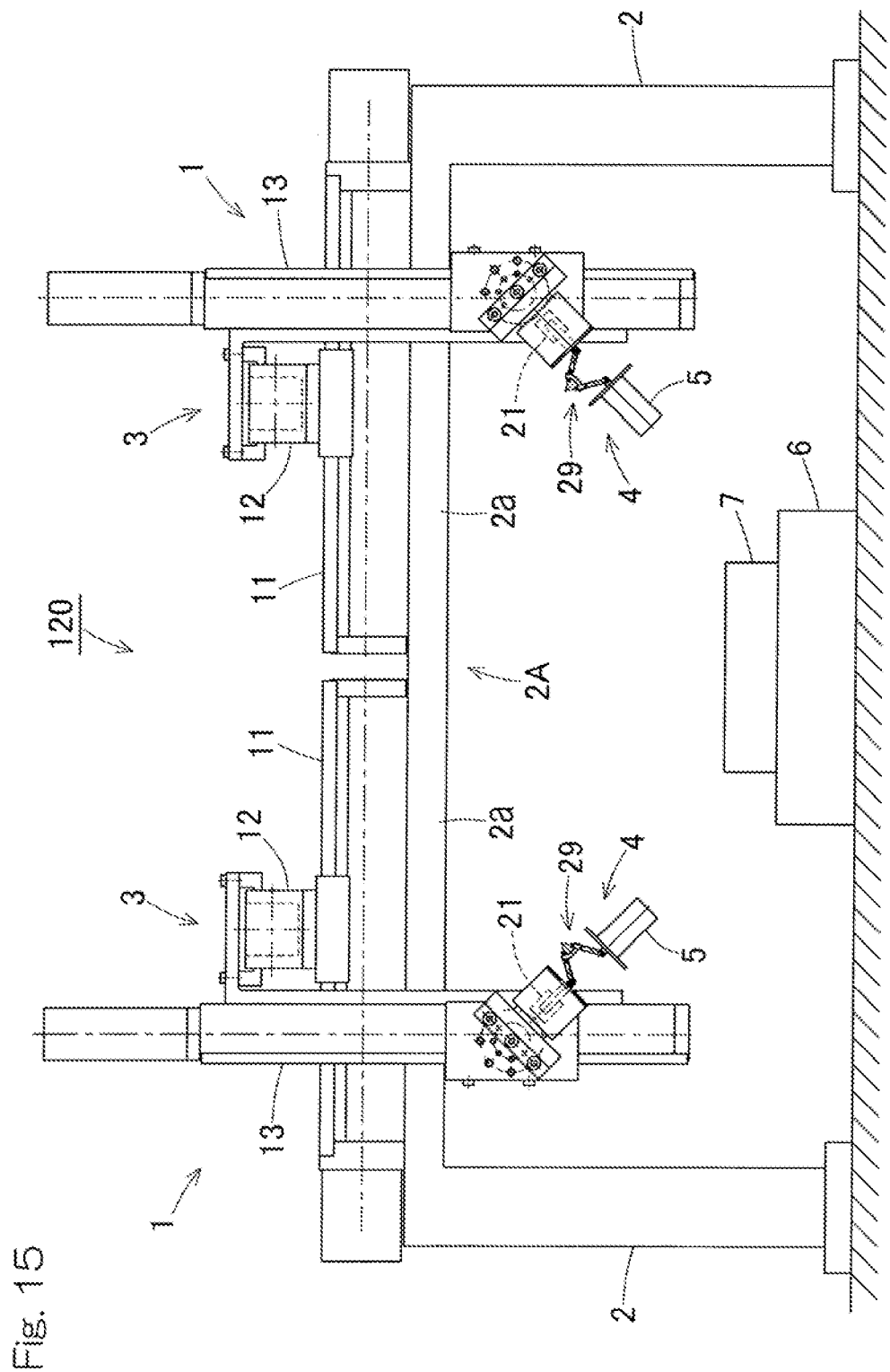
FIG. 15 is a view showing a schematic configuration of a dual-arm work device according to a sixth embodiment of the present invention.
Figure 16:
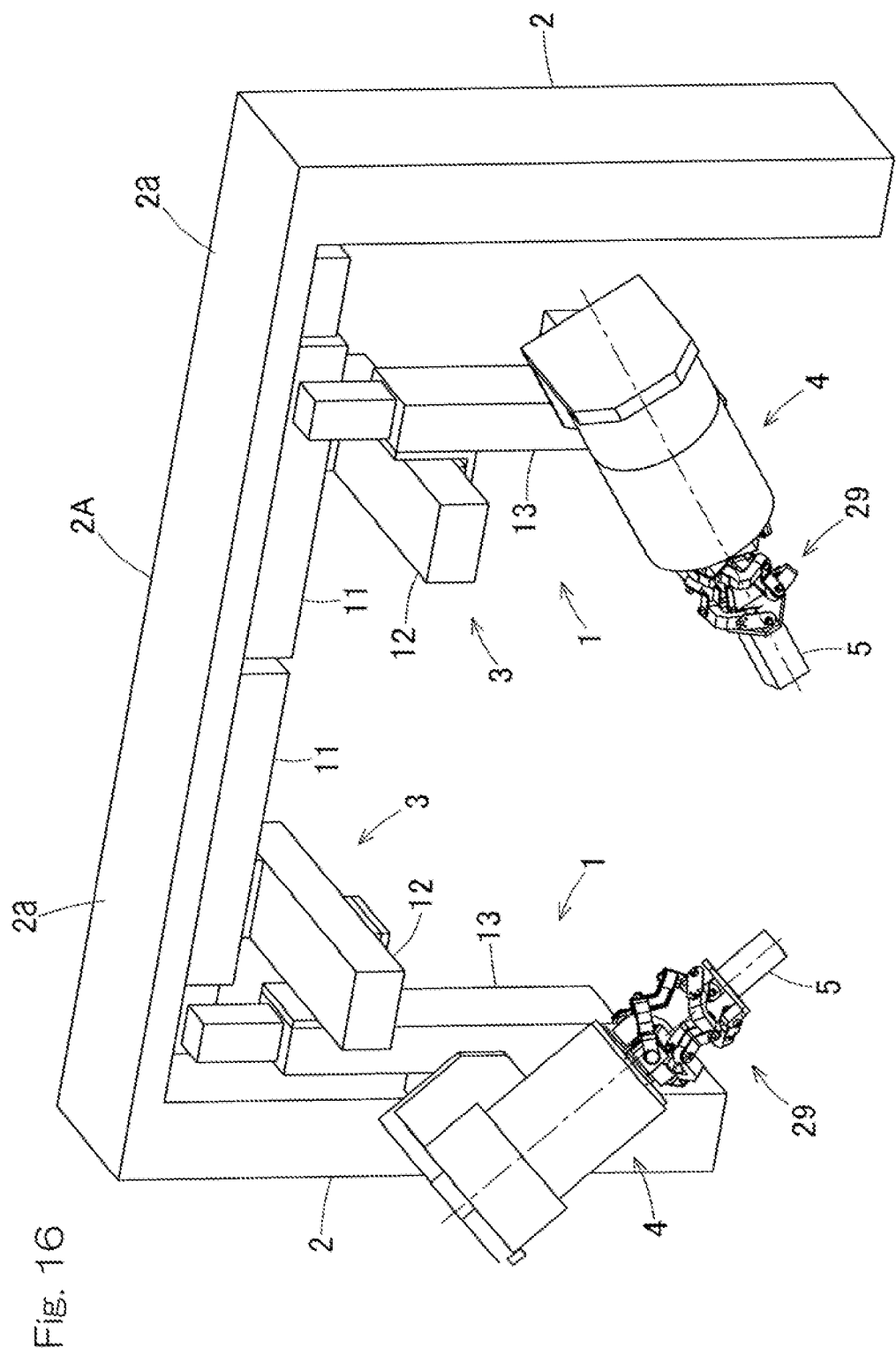
FIG. 16 is a perspective view of the dual-arm work device.
Figure 17:
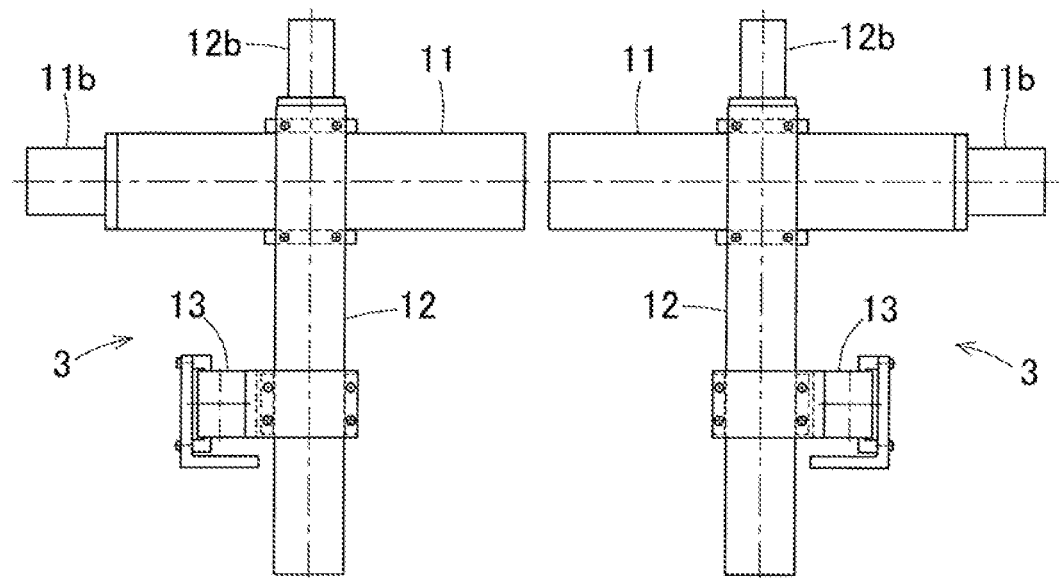
FIG. 17 is a plan view of a linear motion unit of the dual-arm work device.

FIG. 15 to FIG. 17 show a schematic configuration of a dual-arm work device according to a sixth embodiment of the present invention. As shown in a front view in FIG. 15 and a perspective view in FIG. 16, a dual-arm work device 120 is obtained by arraying two work devices 1, each of which is used in the fourth embodiment shown in FIG. 11, such that the work devices 1 are geometrically symmetric with each other. The mounts 2 and 2 of the respective work devices 1 have the horizontal portions 2a and 2a, and the respective ends of the horizontal portions 2a, 2a are connected to each other, thereby forming a portal-shaped mount 2A as a whole. In the sixth embodiment, the work devices 1 according to the fourth embodiment shown in FIG. 11 are used, but work devices according to another embodiment may be used.

By arraying the two work devices 1 to attain the dual-arm type as described above, a work that is performed by a human with both hands can be realized. Accordingly, a work to be performed in place of humans, particularly, a work such as assembling of components, can be performed.

Since the two work devices 1 and 1 are provided to the portal-shaped mount 2A, the workpiece 7 to be worked on can be passed beneath the work devices 1 and 1. For example, as the workpiece placement table 6, a conveyor capable of conveying the workpiece 7 in a direction orthogonal to the surface of the sheet of FIG. 15 may be used, and the work devices 1 and 1 may be provided above a conveyor line of the conveyor. In addition, the range of possible movement, in the widthwise direction, of each of the work devices 1 and 1 can be restricted to be within a range, in the widthwise direction, of the mount 2A. Thus, the occupation areas of the work devices 1 and 1 can be made small. Furthermore, since the ranges of possible movement of the work devices 1 and 1 are restricted, a worker can easily perform a work even when the worker is located at a side of the work devices 1 and 1.

FIG. 17 is a plan view of the linear motion units 3 and 3 of the dual-arm work device 120 shown in FIG. 15 and FIG. 16. As in the linear motion units 3 of the work devices 1 shown in FIG. 1, FIG. 4, and FIG. 11, in these linear motion units 3 and 3, the motor 11b of the first linear motion actuator 11 and the motor 12b of the second linear motion actuator 12 are disposed on the central axes of the linear motion actuators 11 and 12, respectively.

Figure 18:
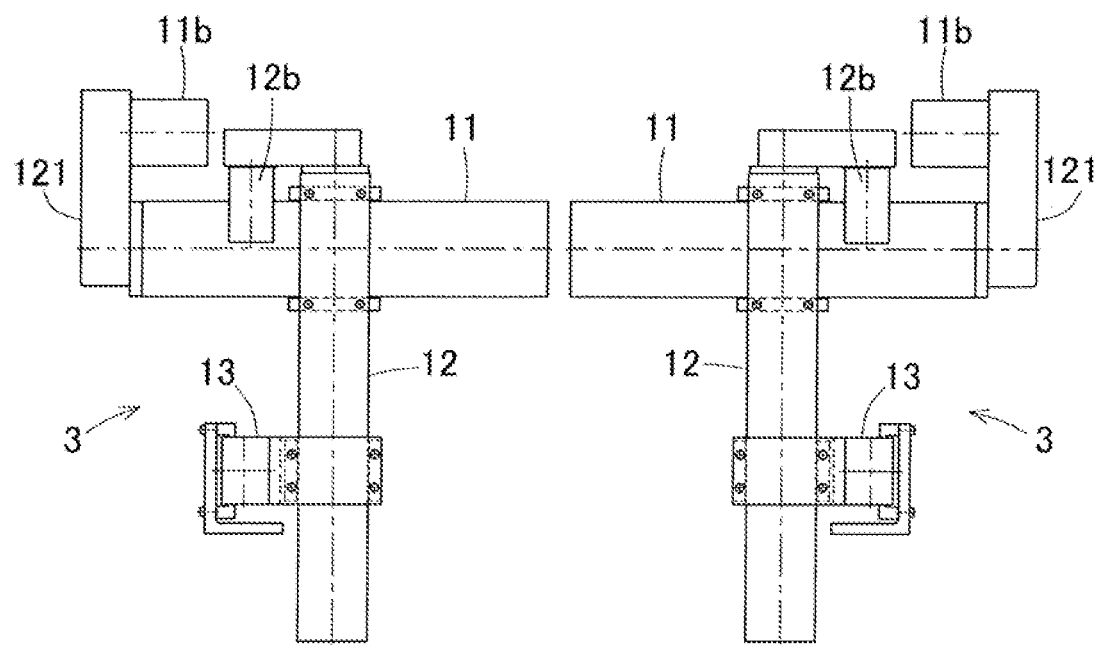
FIG. 18 is a plan view of a linear motion unit of a dual-arm work device according to a seventh embodiment of the present invention.

FIG. 18 is a plan view showing linear motion units 3 and 3 according to a seventh embodiment of the present invention. In the linear motion units 3 and 3 in FIG. 18, the motor 11b of the first linear motion actuator 11 and the motor 12b of the second linear motion actuator 12 are disposed so as to be offset from the central axes of the linear motion actuators 11 and 12, respectively, and the rotations of the motors 11b and 12b are transmitted to drive portions of the linear motion actuators 11 and 12 via motive-power transmitting member 121 such as chains. As described above, the linear motion unit 3 may be changed to that in the sixth embodiment shown in FIG. 17 or that in the seventh embodiment shown in FIG. 18 in accordance with the specifications of the dual-arm work device 120. Such changes can be easily performed since the linear motion unit 3 and the rotation unit 4 are separately provided.

Although the present invention has been fully described in connection with the preferred embodiments thereof with reference to the accompanying drawings, the present invention is not limited to the above-described embodiments, and various additions, changes, or deletions may be made without departing from the gist of the invention. Accordingly, such additions, changes, and deletions are to be construed as included in the scope of the present invention.

REFERENCE NUMERALS

1 . . . work device
2 . . . mount
2A . . . portal-shaped mount
3 . . . linear motion unit
4 . . . rotation unit
5 . . . end effector
11 . . . first linear motion actuator
11a . . . stage
12 . . . second linear motion actuator
12a . . . stage
13 . . . third linear motion actuator
13a . . . stage (output portion of linear motion unit)
20 . . . rotation-unit attachment member (base portion of rotation unit)
21 . . . first rotation mechanism
22 . . . second rotation mechanism
23 . . . third rotation mechanism
23a . . . stage (output portion of rotation unit)
29 . . . link actuation device
31 . . . posture-controlling actuator
32 . . . proximal-end-side link hub
33 . . . distal-end-side link hub
34 . . . link mechanism
35 . . . proximal-side end link member
36 . . . distal-side end link member
37 . . . center link member
100, 101, 102, 112, 113 . . . wiring hole
120 . . . dual-arm work device
O1 . . . central axis of revolute pair between link hub and end link member
O2 . . . central axis of revolute pair between end link member and center link member
PA, PB . . . spherical link center
QA, QB . . . central axis of link hub
S . . . work space

What is claimed is:

1. A work device which performs a work with use of an end effector and has six degrees of freedom, the work device comprising:

a linear motion unit obtained by combining three linear motion actuators, to have three degrees of freedom, the linear motion unit including a first linear motion actuator having a first stage configured to advance and retract in a first direction, a second linear motion actuator having a second stage configured to advance and retract in a second direction, and a third linear motion actuator having a third stage configured to advance and retract in a third direction; and a rotation unit obtained by combining a plurality of rotation mechanisms each having one or more degrees of rotational freedom, to have three degrees of freedom, wherein a base portion of the linear motion unit is fixed to a mount of the work device, a base portion of the rotation unit is mountable to the third stage such that a mounting angle of the rotation unit relative to the third stage is changeable, and the end effector is mounted to an output portion of the rotation unit, wherein the third stage includes at least five holes arranged in a circular pattern to mount the base portion of the rotation unit at a predetermined mounting angle.

2. The work device as claimed in claim 1, wherein the first to third linear motion actuators of the linear motion unit are disposed such that the respective stages face outward relative to a work space in which a work is performed by the end effector.

3. The work device as claimed in claim 1, wherein,
at least one of the plurality of rotation mechanisms in the rotation unit is a link actuation device having two degrees of freedom, the link actuation device including:
a proximal-end-side link hub,
a distal-end-side link hub, and
three or more link mechanisms, the distal-end-side link hub being connected to the proximal-end-side link hub so as to be changeable in posture relative to the proximal-end-side link hub via the three or more link mechanisms, each link mechanism including:
  a proximal-side end link member having one end rotatably connected to the proximal-end-side link hub,
  a distal-side end link member having one end rotatably connected to the distal-end-side link hub, and
  a center link member which has opposed ends rotatably connected to the other ends of the proximal-side end link member and the distal-side end link member, respectively, and
two or more link mechanisms among the three or more link mechanisms each include a posture-controlling actuator configured to arbitrarily change a posture of the distal-end-side link hub relative to the proximal-end-side link hub.

4. The work device as claimed in claim 3, wherein
a point at which a central axis of a revolute pair between the proximal-end-side link hub and each proximal-side end link member intersects with a central axis of a revolute pair between the proximal-side end link member and the corresponding center link member, is referred to as a proximal-end-side spherical link center,
a straight line that passes the proximal-end-side spherical link center and that intersects, at a right angle, with the central axis of the revolute pair between the proximal-end-side link hub and the proximal-side end link member, is referred to as a central axis of the proximal-end-side link hub,
a point at which a central axis of a revolute pair between the distal-end-side link hub and each distal-side end link member intersects with a central axis of a revolute pair between the distal-side end link member and the corresponding center link member, is referred to as a distal-end-side spherical link center,
a straight line that passes the distal-end-side spherical link center and that intersects, at the right angle, with the central axis of the revolute pair between the distal-end-side link hub and the distal-side end link member, is referred to as a central axis of the distal-end-side link hub, and
the central axis of the proximal-end-side link hub or the central axis of the distal-end-side link hub, and a rotation axis of another rotation mechanism other than the link actuation device, are positioned on a same line.

5. The work device as claimed in claim 4, wherein
a rotating portion of the another rotation mechanism is directly or indirectly joined to the proximal-end-side link hub of the link actuation device, and
the end effector is mounted to the distal-end-side link hub of the link actuation device.

6. The work device as claimed in claim 4, wherein
the another rotation mechanism has a wiring hole therein which penetrates at least a rotating portion thereof in an axial direction.

7. A dual-arm work device obtained by arraying two work devices each of which is claimed in claim 1, such that the work devices are geometrically symmetric with each other.

8. The dual-arm work device as claimed in claim 7, wherein
the two work devices are provided on the mount which is portal-shaped.

9. The working device as claimed in claim 1, wherein
the base portion of the rotation unit is a rotation-unit attachment member,
the rotation-unit attachment member is mountable to the third stage via attachment bolts inserted into the third stage in a direction perpendicular to the third direction.

10. The working device as claimed in claim 1, wherein
at least one of the plurality of rotating mechanisms of the rotation unit is a link actuation device having two degrees of freedom, the link actuation device including:
  a proximal end side link hub connected to another rotating mechanism among the plurality of rotating mechanisms of the rotation unit,
  a distal end side link hub corresponding to the output portion of the rotation unit and to which the end effector is mounted on, and
  three or more link mechanisms via which the distal end side link hub is coupled to the proximal end side link hub such that a posture of the distal end side link hub can be changed relative to the proximal end side link hub.

11. The working device as claimed in claim 10, wherein
the base portion of the rotation unit is a rotation-unit attachment member,
the another rotating mechanism is mounted to the rotation-unit attachment member, has one degree of freedom, and is to rotate the link actuation device about a central axis of the proximal end side link hub, and
the proximal end side link hub is connected to the another rotating mechanism via a base member which is fixed to a rotating portion of the another rotating mechanism.

12. A work device which performs a work with use of an end effector and has six degrees of freedom, the work device comprising:
a linear motion unit obtained by combining three linear motion actuators, to have three degrees of freedom, the linear motion unit including a first linear motion actuator having a first stage configured to advance and retract in a first direction, a second linear motion actuator having a second stage configured to advance and retract in a second direction, and a third linear motion actuator having a third stage configured to advance and retract in a third direction; and
a rotation unit obtained by combining a plurality of rotation mechanisms each having one or more degrees of rotational freedom, to have three degrees of freedom, wherein
a base portion of the linear motion unit is fixed to a mount of the work device,
a base portion of the rotation unit is mountable to the third stage such that a mounting angle of the rotation unit relative to the third stage is changeable, and
the end effector is mounted to an output portion of the rotation unit wherein
at least one of the plurality of rotation mechanisms in the rotation unit is a link actuation device having two degrees of freedom, the link actuation device including:
a proximal-end-side link hub,
a distal-end-side link hub, and
three or more link mechanisms, the distal-end-side link hub being connected to the proximal-end-side link hub so as to be changeable in posture relative to the proximal-end-side link hub via the three or more link mechanisms, each link mechanism including:
   a proximal-side end link member having one end rotatably connected to the proximal-end-side link hub,
   a distal-side end link member having one end rotatably connected to the distal-end-side link hub, and
   a center link member which has opposed ends rotatably connected to the other ends of the proximal-side end link member and the distal-side end link member, respectively, and
two or more link mechanisms among the three or more link mechanisms each include a posture-controlling actuator configured to arbitrarily change a posture of the distal-end-side link hub relative to the proximal-end-side link hub,
a point at which a central axis of a revolute pair between the proximal-end-side link hub and each proximal-side end link member intersects with a central axis of a revolute pair between the proximal-side end link member and the corresponding center link member, is referred to as a proximal-end-side spherical link center,
a straight line that passes the proximal-end-side spherical link center and that intersects, at a right angle, with the central axis of the revolute pair between the proximal-end-side link hub and the proximal-side end link member, is referred to as a central axis of the proximal-end-side link hub,
a point at which a central axis of a revolute pair between the distal-end-side link hub and each distal-side end link member intersects with a central axis of a revolute pair between the distal-side end link member and the corresponding center link member, is referred to as a distal-end-side spherical link center,
a straight line that passes the distal-end-side spherical link center and that intersects, at the right angle, with the central axis of the revolute pair between the distal-end-side link hub and the distal-side end link member, is referred to as a central axis of the distal-end-side link hub,
the central axis of the proximal-end-side link hub or the central axis of the distal-end-side link hub, and a rotation axis of another rotation mechanism other than the link actuation device, are positioned on a same line,
a rotating portion of the another rotation mechanism is directly or indirectly joined to the proximal-end-side link hub of the link actuation device,
the end effector is mounted to the distal-end-side link hub of the link actuation device,
the two or more posture-controlling actuators of the link actuation device are rotary actuators,
rotational output shafts of the rotary actuators are arranged so as to be parallel to the central axis of the proximal-end-side link hub,
rotational drive forces of the rotational output shafts are transmitted to the link mechanisms via speed reducers of axis-orthogonal configuration, and
the another rotation mechanism is disposed at a center portion in the arrangement of the posture-controlling actuators.

13. A work device which performs a work with use of an end effector and has six degrees of freedom, the work device comprising:
a linear motion unit obtained by combining three linear motion actuators, to have three degrees of freedom, the linear motion unit including a first linear motion actuator having a first stage configured to advance and retract in a first direction, a second linear motion actuator having a second stage configured to advance and retract in a second direction, and a third linear motion actuator having a third stage configured to advance and retract in a third direction; and
a rotation unit obtained by combining a plurality of rotation mechanisms each having one or more degrees of rotational freedom, to have three degrees of freedom, wherein
a base portion of the linear motion unit is fixed to a mount of the work device,
a base portion of the rotation unit is mountable to the third stage such that a mounting angle of the rotation unit relative to the third stage is changeable, and
the end effector is mounted to an output portion of the rotation unit
wherein
the base portion of the rotation unit is a rotation-unit attachment member,
the third stage includes at least five holes arranged in a circular pattern to mount the rotation-unit attachment member to the third stage, and
the rotation-unit attachment member is mounted to the third stage via fastening members inserted into at least two of the at least five holes, the fastening members being arranged in a linear pattern.

* * * * *

UNITED STATES PATENT AND TRADEMARK OFFICE
CERTIFICATE OF CORRECTION

PATENT NO. : 11,154,994 B2  
APPLICATION NO. : 16/164486  
DATED : October 26, 2021  
INVENTOR(S) : Hiroshi Isobe et al.

Page 1 of 1

It is certified that error appears in the above-identified patent and that said Letters Patent is hereby corrected as shown below:

In the Claims

Column 20, Line 14:
In Claim 9, delete "working device" and insert -- work device --

Column 20, Line 20:
In Claim 10, delete "working device" and insert -- work device --

Column 20, Line 35:
In Claim 11, delete "working device" and insert -- work device --

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*